(12) United States Patent
Sasaki et al.

(10) Patent No.: US 11,402,208 B2
(45) Date of Patent: Aug. 2, 2022

(54) VIBRATION ELEMENT, METHOD OF MANUFACTURING VIBRATION ELEMENT, PHYSICAL QUANTITY SENSOR, INERTIAL MEASUREMENT UNIT, ELECTRONIC DEVICE, AND VEHICLE

(71) Applicant: SEIKO EPSON CORPORATION, Tokyo (JP)

(72) Inventors: Shogo Sasaki, Shiojiri (JP); Masashi Shimura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 179 days.

(21) Appl. No.: 16/722,893

(22) Filed: Dec. 20, 2019

(65) Prior Publication Data
US 2020/0200533 A1 Jun. 25, 2020

(30) Foreign Application Priority Data

Dec. 21, 2018 (JP) .............................. JP2018-239223

(51) Int. Cl.
| | |
|---|---|
| *G01C 19/5656* | (2012.01) |
| *G01C 19/5663* | (2012.01) |
| *G01C 19/5621* | (2012.01) |
| *G01C 19/5628* | (2012.01) |

(52) U.S. Cl.
CPC ..... *G01C 19/5656* (2013.01); *G01C 19/5663* (2013.01); *G01C 19/5621* (2013.01); *G01C 19/5628* (2013.01)

(58) Field of Classification Search
CPC .................................................. G01C 19/5663
See application file for complete search history.

(56) References Cited

U.S. PATENT DOCUMENTS

| | | | | |
|---|---|---|---|---|
| 9,222,775 | B2* | 12/2015 | Nakagawa | G01C 19/5621 |
| 2006/0070442 | A1* | 4/2006 | Kawauchi | G01C 19/5628 |
| | | | | 73/504.12 |
| 2012/0126664 | A1* | 5/2012 | Ogura | H01L 41/107 |
| | | | | 29/25.35 |
| 2019/0301867 | A1 | 10/2019 | Sasaki et al. | |
| 2019/0301869 | A1 | 10/2019 | Sasaki et al. | |

FOREIGN PATENT DOCUMENTS

| | | |
|---|---|---|
| JP | 2017203692 | 11/2017 |
| JP | 2018165644 | 10/2018 |
| JP | 2019-176413 | 10/2019 |
| JP | 2019-178904 | 10/2019 |

* cited by examiner

*Primary Examiner* — Paul M. West
*Assistant Examiner* — Mark A Shabman
(74) *Attorney, Agent, or Firm* — Workman Nydegger

(57) ABSTRACT

A processing mark that is thinned or removed in a thickness direction of a vibration arm is formed at a weight provided at a drive vibration arm of a vibration element, and including a pair of weight ends aligned in an extending direction of the vibration arm. The processing mark includes a first processing end and a second processing end aligned in the extending direction of the vibration arm, the first processing end overlaps one weight end of the weight in plan view in the extending direction of the vibration arm, and a width of the first processing end is smaller than a width of the second processing end.

18 Claims, 26 Drawing Sheets

VIBRATION ELEMENT, METHOD OF MANUFACTURING VIBRATION ELEMENT, PHYSICAL QUANTITY SENSOR, INERTIAL MEASUREMENT UNIT, ELECTRONIC DEVICE, AND VEHICLE

The present application is based on, and claims priority from JP Application Serial Number 2018-239223, filed Dec. 21, 2018, the disclosure of which is hereby incorporated by reference herein in its entirety.

BACKGROUND

1. Technical Field

The present disclosure relates to a vibration element, a method of manufacturing the vibration element, a physical quantity sensor, an inertial measurement unit, an electronic device, and a vehicle.

2. Related Art

In the related art, a physical quantity detection device that detects a physical quantity such as an angular velocity and acceleration using a vibration element such as a piezoelectric vibrator or a micro electromechanical systems (MEMS) vibrator is known.

As an example of such a physical quantity detection device, for example, JP-A-2017-203692 discloses a vibrating gyroscope provided with a piezoelectric vibrator element provided with a base, a coupling arm extending from the base, a plurality of drive vibration arms extending from a tip end of the coupling arm, and a plurality of detection vibration arms extending from the base. In such a vibrating gyroscope, when an angular velocity in a predetermined direction is received with the drive vibration arm flexibly vibrated, Coriolis force acts on the drive vibration arm, and accordingly, the detection vibration arm is flexibly vibrated. The angular velocity can be detected by detecting such flexural vibration of the detection vibration arm.

In addition, the vibrating gyroscope described in JP-A-2017-203692 describes that a frequency is adjusted by forming a weight for frequency adjustment at a tip end of a vibration arm of the vibration element, irradiating the weight with a laser or ion beam, and changing a resonance frequency of the vibration element by removing the weight. In this method, the amount of removal is calculated from an adjustment rate, and the corresponding weight is removed to adjust the frequency, based on the amount of change in the resonance frequency with respect to the amount of removal of the weight, that is, the amount of change in frequency when the adjustment rate is predicted in advance and adjusted to a target frequency.

However, when the frequency of the vibration element is adjusted by removing the weight, due to variations in position when the vibration element is mounted, or variations in processing position of the frequency adjustment device such as an ion beam frequency adjustment device and a laser irradiation device, the removal position on the weight varies, and accordingly, the adjustment rate fluctuates. Therefore, even when the weight is removed based on the amount of removal of the pre-calculated weight corresponding to the amount of change in frequency up to the target frequency, there is a problem in that it does not reach an accurate target frequency, and in that case, adjustment takes time such as removing the weight again.

SUMMARY

A vibration element according to an aspect of the present application includes a base, a vibration arm extending from the base, and a weight provided at the vibration arm, and including a pair of weight ends aligned in an extending direction of the vibration arm, in which a processing mark in which the weight is thinned or removed in a thickness direction of the vibration arm at a portion of the weight, is formed at the weight, the processing mark includes a first processing end and a second processing end aligned in the extending direction of the vibration arm, at least the first processing end overlaps one weight end of the pair of weight ends of the weight in plan view in the extending direction of the vibration arm, and a width of the first processing end in a width direction of the vibration arm, which is a direction orthogonal to the extending direction of the vibration arm and the thickness direction of the vibration arm, is smaller than a width of the second processing end in the width direction of the vibration arm.

In the above vibration element, the pair of weight ends may include a first weight end and a second weight end located at a position closer than the first weight end with the base as a reference, and the first processing end may overlap the first weight end in plan view.

In the above vibration element, the pair of weight ends may include a first weight end and a second weight end located at a position closer than the first weight end with the base as a reference, and the first processing end may overlap the second weight end in plan view.

In the above vibration element, the second processing end may not overlap either of the pair of weight ends in plan view, in other words, the second processing end may be located in an area where the weight is formed.

In the above vibration element, the processing mark may have a rectangular shape.

In the above vibration element, a width H1 of the first processing end may have a relationship of 32% or more and 96% or less of a width H2 of the second processing end.

In the above vibration element, a width H1 of the first processing end may have a relationship of 80% or more and 88% or less of a width H2 of the second processing end.

A method of manufacturing a vibration element according to another aspect of the present application is a method of manufacturing a vibration element including a base, a vibration arm extending from the base, and a weight provided at the vibration arm, and including a pair of weight ends aligned in an extending direction of the vibration arm, the method including: forming a processing mark in which the weight is thinned or removed in a thickness direction of the vibration arm at a portion of the weight, at the weight, in which the formed processing mark includes a first processing end and a second processing end aligned in the extending direction of the vibration arm, at least the first processing end overlaps one weight end of the pair of weight ends of the weight in plan view in the extending direction of the vibration arm, and a width of the first processing end in a width direction of the vibration arm, which is a direction orthogonal to the extending direction of the vibration arm and the thickness direction of the vibration arm, is smaller than a width of the second processing end in the width direction of the vibration arm.

A physical quantity sensor according to another aspect of the present application includes the above vibration element, and a package that houses the vibration element.

An inertial measurement unit according to another aspect of the present application includes the above physical quantity sensor, and a circuit electrically coupled to the physical quantity sensor.

An electronic device according to another aspect of the present application includes the above vibration element, and a circuit that outputs a drive signal to the vibration element.

A vehicle according to another aspect of the present application includes a physical quantity sensor having the above vibration element, and a circuit that outputs a drive signal to the physical quantity sensor.

DESCRIPTION OF EXEMPLARY EMBODIMENTS

Hereinafter, preferred embodiments of a vibration element, a method of manufacturing the vibration element, a physical quantity sensor, an inertial measurement unit, an electronic device, and a vehicle will be described in detail with reference to the accompanying drawings. Each drawing includes a part that is enlarged or reduced as appropriate so that a part to be described can be recognized, and a part that is schematically illustrated.

Embodiment

1. Physical Quantity Sensor

Figure 1:
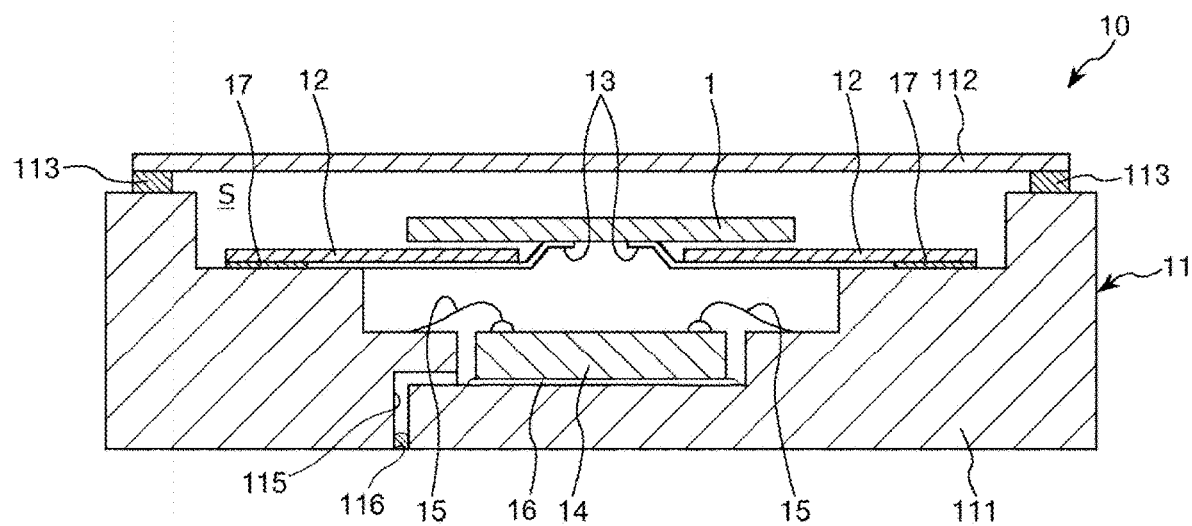
FIG. 1 is a cross-sectional view illustrating a physical quantity sensor provided with a vibration element according to an embodiment.

First, a physical quantity sensor including a vibration element according to an embodiment will be briefly described with reference to FIG. 1. FIG. 1 is a cross-sectional view illustrating a physical quantity sensor provided with a vibration element according to an embodiment.

A physical quantity sensor 10 illustrated in FIG. 1 includes a vibration element 1, a package 11 that accommodates the vibration element 1, a support substrate 12 that supports the vibration element 1 with respect to the package 11, a wiring pattern 13, and a circuit element 14 arranged in the package 11.

The package 11 includes a box-shaped base 111 having a recessed portion for housing the vibration element 1, and a plate-shaped lid 112 bonded to the base 111 via a bonding member 113 so as to close an opening of the recessed portion of the base 111. A space S that is a closed space in the package 11 may be in a reduced pressure or vacuum state, or may be sealed with an inert gas such as nitrogen, helium, or argon. In addition, a through-hole 115 as a sealing hole is provided at a bottom portion of the base 111, and the through-hole 115 is sealed with a sealing material 116 formed using, for example, various glass materials or metal materials. In addition, a portion of the lid 112 of the package 11 may be recessed, and after bonding the lid 112 and a seal ring, sealing may be performed by irradiating the recessed portion of the lid with laser.

The recessed portion of the base 111 includes an upper step surface located on an opening side, a lower step surface located on a bottom portion side, and a middle step surface located between these surfaces. The constituent material of the base 111 is not particularly limited, and various ceramics such as aluminum oxide and various glass materials can be used. In addition, the constituent material of the lid 112 is not particularly limited, and is preferably a material whose linear expansion coefficient approximates that of the constituent material of the base 111. For example, when the constituent material of the base 111 is the ceramic as described above, an alloy such as kovar is preferable. In addition, in the present embodiment, a seal ring is used as the bonding member 113, and the bonding member 113 may be configured using, for example, low-melting glass, an adhesive, or the like.

A plurality of coupling terminals (not illustrated) are provided at the upper step surface and the middle step surface of the recessed portion of the base 111, respectively. Among the plurality of coupling terminals provided at the middle step surface, a portion of the coupling terminals are electrically coupled to terminals (not illustrated) provided at the bottom surface of the base 111 via wiring layers (not illustrated) provided at the base 111. The remaining portions of the coupling terminals are electrically coupled to a plurality of coupling terminals provided in the upper stage via wiring (not illustrated). These coupling terminals are not particularly limited as long as these have conductivity. For example, these coupling terminals are made of a metal film in which films such as nickel (Ni), gold (Au), silver (Ag), and copper (Cu) are laminated on a base layer of metallization layer such as chromium (Cr) and tungsten (W).

The circuit element 14 is fixed to the lower step surface of the recessed portion of the base 111 with an adhesive 16 or the like. As the adhesive 16, for example, an epoxy-based, silicone-based, or polyimide-based adhesive can be used. The circuit element 14 has a plurality of terminals (not illustrated), and each terminal is electrically coupled to each coupling terminal provided at the above-described middle step surface by a conductive wire 15. The circuit element 14 includes a drive circuit for driving and vibrating the vibration element 1 and a detection circuit for detecting detection vibration generated in the vibration element 1 when an angular velocity is applied.

In addition, the wiring pattern 13 is coupled to the plurality of coupling terminals provided at the upper step surface of the recessed portion of the base 111 via a conductive adhesive 17. The wiring pattern 13 is bonded to the support substrate 12. In addition, as the conductive adhesive 17, for example, an epoxy-based, silicone-based or polyimide-based conductive adhesive mixed with a conductive material such as a metal filler can be used.

The support substrate 12 has an opening at the center, and a plurality of long leads of the wiring pattern 13 extend into the opening. The vibration element 1 is coupled to the tip ends of these leads via conductive bumps (not illustrated).

In the present embodiment, the circuit element 14 is provided inside the package 11, and the circuit element 14 may be provided outside the package 11.

2. Vibration Element

Figure 2:
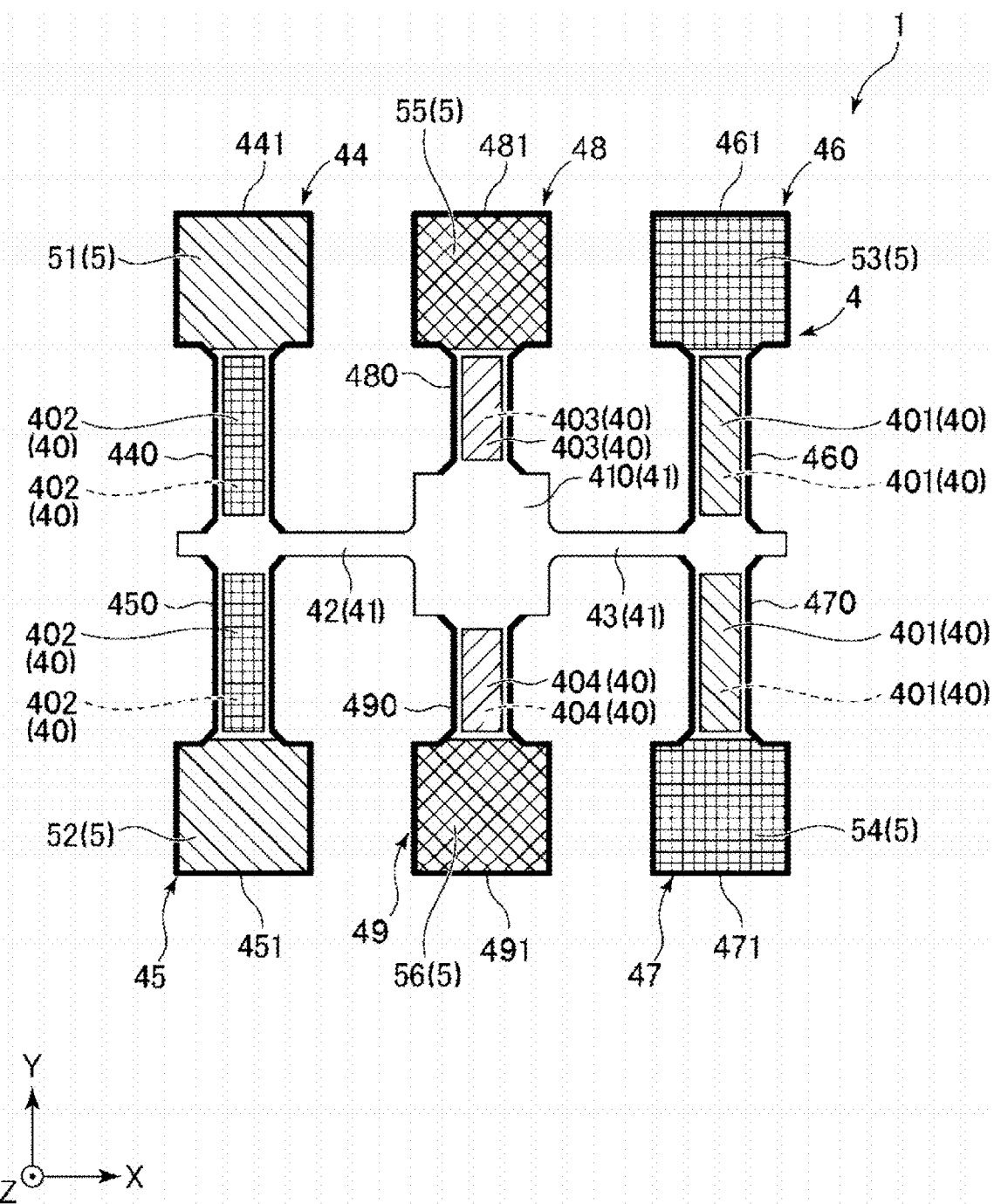
FIG. 2 is a plan view of the vibration element.
Figure 3A:
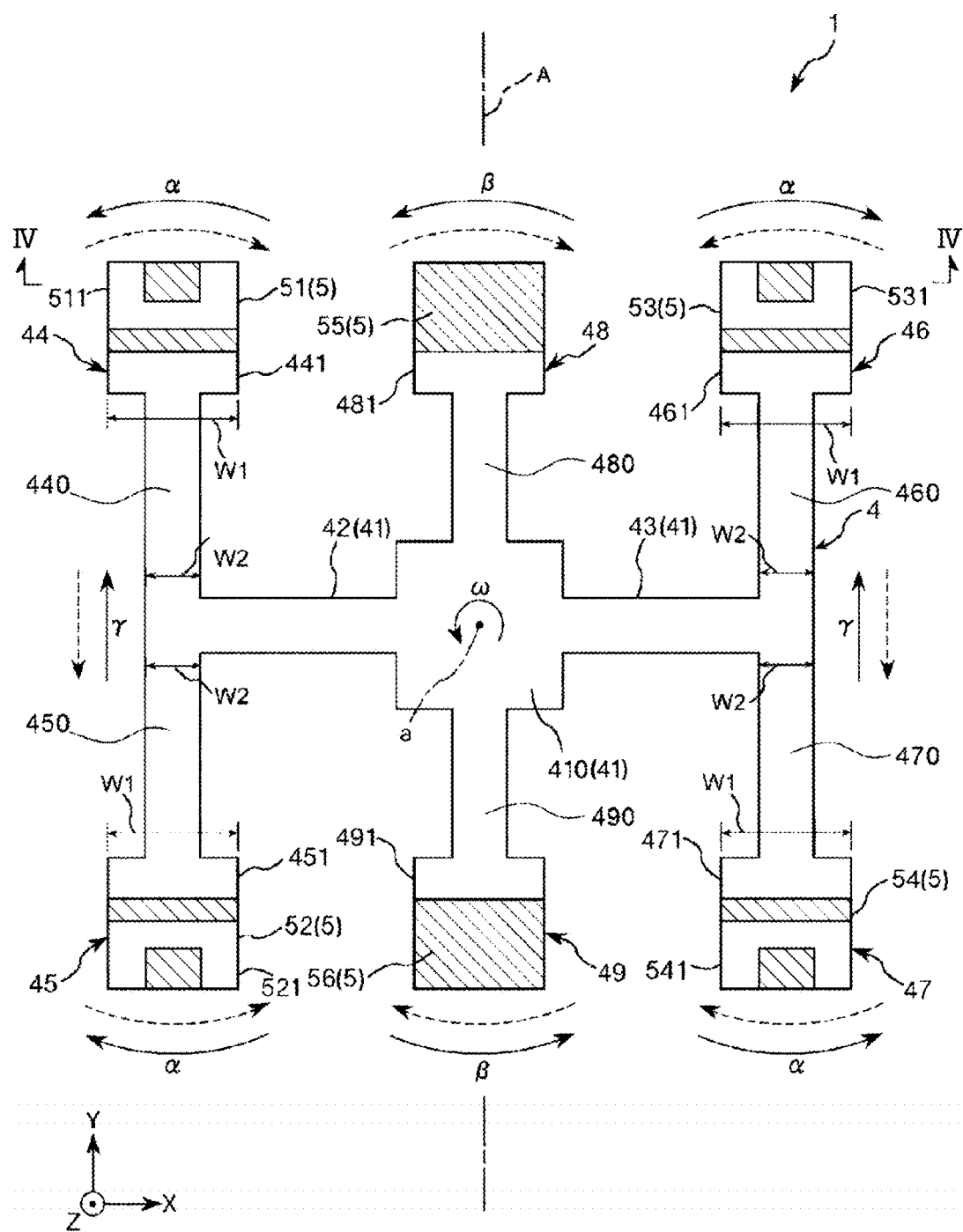
FIG. 3A is a plan view of the vibration element, and the view for describing an operation of the vibration element.
Figure 3B:
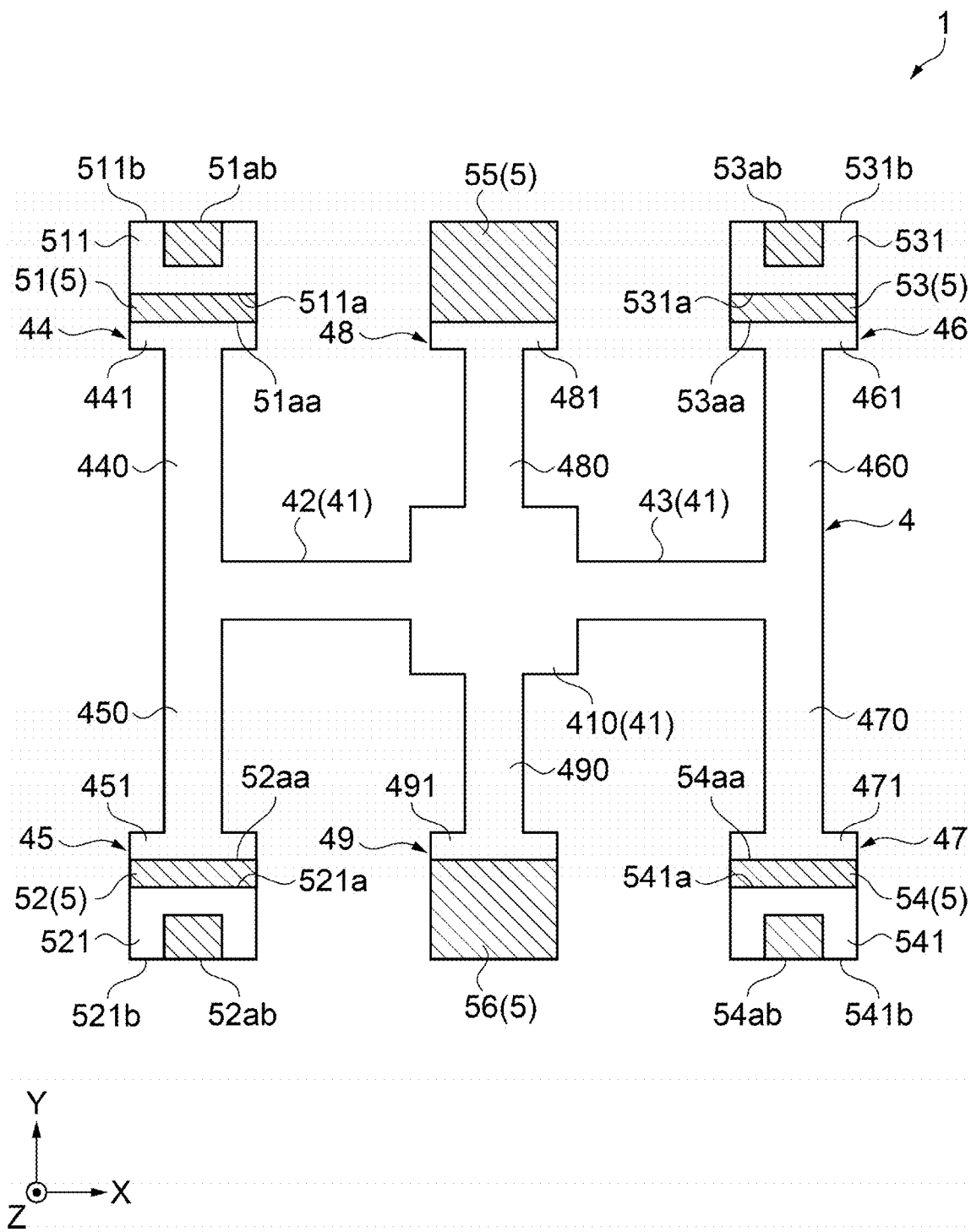
FIG. 3B is a plan view of the vibration element, and the view for describing a weight and a processing mark.
Figure 4:
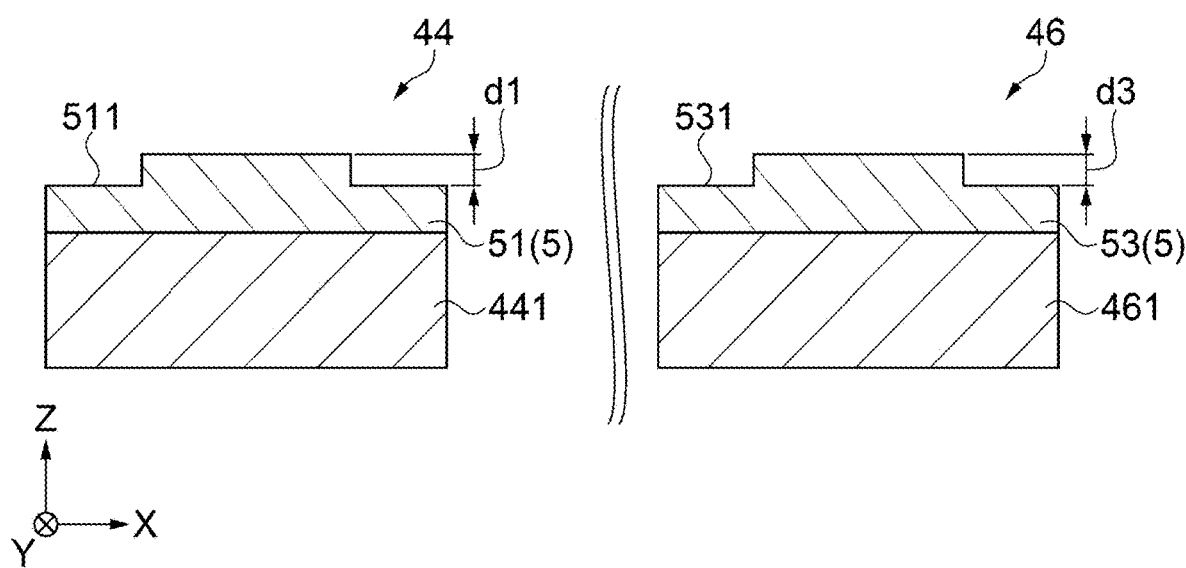
FIG. 4 is a cross-sectional view taken along line IV-IV in FIG. 3A.

Next, the vibration element according to the embodiment will be described with reference to FIGS. 2, 3A, 3B, and 4. FIG. 2 is a plan view of the vibration element. FIG. 3A is a plan view of the vibration element, and the view for describing an operation of the vibration element. FIG. 3B is a plan view of the vibration element, and the view for describing a weight and a processing mark. FIG. 4 is a cross-sectional view taken along line IV-IV in FIG. 3A. In FIGS. 2, 3A, 3B, and 4, for convenience of description, an X axis, a Y axis, and a Z axis are illustrated as three axes orthogonal to each other. A tip end side of the arrow indicating each axis is defined as "+", and a base end side is defined as "−". In addition, a direction parallel to the X axis is referred to as "X direction", a direction parallel to the Y axis is referred to as "Y direction", and a direction parallel to the Z axis is referred to as "Z direction". In addition, the +Z axis direction side is also referred to as "upper", and the −Z axis direction side is also referred to as "lower". In addition, in the present embodiment, the X axis, the Y axis, and the Z axis correspond to an electrical axis, a mechanical axis, and an optical axis, which are crystal axes of quartz, respectively.

The vibration elements 1 illustrated in FIGS. 2 and 3A are sensor elements that detect an angular velocity ω around the Z axis. The vibration element 1 includes a vibrating body 4, and an electrode film pattern (not illustrated) and a weight pattern 5 formed on the surface of the vibrating body 4. In FIGS. 3A, 3B, and 4, illustration of the electrode film pattern is omitted.

Vibrating Body

The vibrating body 4 includes a spread in the XY plane defined by the Y axis (mechanical axis) and the X axis (electrical axis) which are crystal axes of a quartz substrate, and has a plate shape having a thickness in the Z axis (optical axis) direction. That is, the vibrating body 4 is configured to include a Z-cut quartz plate. The Z axis does not necessarily coincide with the thickness direction of the vibrating body 4, and may be slightly inclined with respect to the thickness direction from the viewpoint of reducing the change due to the temperature of the frequency near the normal temperature. Specifically, the Z-cut quartz plate includes a quartz plate having a cut angle such that a surface obtained by rotating a plane orthogonal to the Z axis within a range of 0 degrees or more and 10 degrees or less around at least one of the X axis and the Y axis is the main surface. The vibrating body 4 may be one having no piezoelectricity, such as silicon. In this case, a piezoelectric element may be appropriately provided at the vibrating body 4.

The vibrating body 4 of the present embodiment has a so-called double T type shape. The vibrating body 4 includes a base main body 410, a pair of coupling arms 42 and 43 extending from the base main body 410, and two drive vibration arms 44 and 45 as vibration arms extending from the coupling arm 42, two drive vibration arms 46 and 47 as vibration arms extending from the coupling arm 43, and two detection vibration arms 48 and 49 extending from the base main body 410. A base 41 is configured to include the base main body 410 and the pair of coupling arms 42 and 43. The vibrating body 4 is formed symmetrically on the left and right in FIG. 2. In other words, the vibrating body 4 is formed symmetrically with a line segment A passing through the center of the base main body 410 illustrated in FIG. 3A as a symmetric axis. In the present embodiment, the pair of drive vibration arms 44 and 46 that are parallel to each other and extend in the +Y direction which is the same direction with respect to the base 41, and the pair of drive vibration arms 45 and 47 that are parallel to each other and extend in the −Y direction which is the same direction with respect to the base 41 are included. That is, in the present embodiment, there are two set of "pairs of vibration arms".

The base 41 is fixed to the base 111 of the package 11 via the support substrate 12 and the wiring pattern 13 described above.

The coupling arms 42 and 43 extend in the opposite directions each other from the base 41 along the X direction. A groove or a hole extending in the length direction, that is, the X direction may be provided at each of the upper and lower surfaces of the coupling arms 42 and 43.

The drive vibration arms 44 and 45 as vibration arms extend in opposite directions each other along the Y direction from the tip end of the coupling arm 42. Similarly, the drive vibration arms 46 and 47 as the vibration arms extend in opposite directions each other along the Y direction from the tip end of the coupling arm 43. In the present embodiment, the drive vibration arms 44, 45, 46, and 47 include arm portions 440, 450, 460, and 470 located on the base 41 side, and weight portions 441, 451, 461, and 471 located on the tip end side of the arm portions 440, 450, 460, and 470, that is, on the opposite side of the base 41. Widths W1 of the weight portions 441, 451, 461, and 471 are wider than widths W2 of the arm portions 440, 450, 460, and 470. As will be described later, grooves or holes extending in the extending direction may be provided at the upper and lower surfaces of the drive vibration arms 44 to 47, respectively.

The detection vibration arms 48 and 49 extend from the base 41 in the opposite directions each other along the Y direction. In the present embodiment, the detection vibration arms 48 and 49 include arm portions 480 and 490 located on the base 41 side, and weight portions 481 and 491 located on the tip end side of the arm portions 480 and 490, that is, on the opposite side of the base 41. The widths of the weight portions 481 and 491 are wider than the widths of the arm portions 480 and 490. Grooves or holes extending in the extending direction may be provided at the upper and lower surfaces of the detection vibration arms 48 and 49, respectively.

Electrode Film Pattern

As illustrated in FIG. 2, an electrode film pattern 40 provided at the surface of the vibrating body 4 described above includes a drive signal electrode 401 and a drive ground electrode 402 provided in the arm portions 440, 450, 460, and 470 of the drive vibration arms 44 to 47, detection signal electrodes 403 and 404 and detection ground electrodes (not illustrated) provided in the arm portions 480 and 490 of the detection vibration arms 48 and 49, and a plurality of terminals (not illustrated) provided in the base 41 corresponding to these electrodes.

The drive signal electrode 401 is an electrode for exciting drive vibrations of the drive vibration arms 44 to 47. The drive signal electrodes 401 are provided at the upper and lower surfaces of the arm portion 460 and both side surfaces (not illustrated) of the arm portion 440, respectively. Similarly, the drive signal electrodes 401 are provided at the upper and lower surfaces of the arm portion 470 and both side surfaces (not illustrated) of the arm portion 450, respectively.

On the other hand, the drive ground electrode 402 has a reference potential (for example, ground potential) with respect to the drive signal electrode 401. The drive ground electrode 402 is provided at both side surfaces (not illustrated) of the arm portion 460 and the upper and lower surfaces of the arm portion 440, respectively. Similarly, the drive ground electrode 402 is provided at both side surfaces (not illustrated) of the arm portion 470 and the upper and lower surfaces of the arm portion 450, respectively.

The detection signal electrode 403 is an electrode for detecting charges generated by the detection vibration when the detection vibration of the detection vibration arm 48 is excited. The detection signal electrodes 403 are provided at the upper and lower surfaces of the arm portion 480.

On the other hand, the detection ground electrode (not illustrated) has a reference potential (for example, ground potential) with respect to the detection signal electrode 403. The detection ground electrodes are provided at both side surfaces (not illustrated) of the arm portion 480.

The detection signal electrode 404 is an electrode for detecting charges generated by the detection vibration when the detection vibration of the detection vibration arm 49 is excited. The detection signal electrode 404 is provided at the upper and lower surfaces of the arm portion 490.

On the other hand, the detection ground electrode (not illustrated) has a reference potential (for example, ground potential) with respect to the detection signal electrode 404. The detection ground electrodes are provided at both side surfaces (not illustrated) of the arm portion 490.

Vibration may be detected by a differential signal between the detection signal electrode 403 of the detection vibration arm 48 and the detection signal electrode 404 of the detection vibration arm 49.

Weight Pattern

The weight patterns 5 are disposed at portions provided at the tip ends of the drive vibration arms 44, 45, 46, and 47, among the electrode film patterns 40 described above. As illustrated in FIGS. 3A and 3B, the plurality of weight patterns 5 include weights 51, 52, 53, and 54 provided at weight portions 441, 451, 461, and 471 located at the tip ends of the drive vibration arms 44, 45, 46, and 47, and weights 55 and 56 provided at weight portions 481 and 491 located at the tip ends of the detection vibration arms 48 and 49. In FIGS. 3A and 3B, the electrode film patterns 40 are not illustrated.

The weights 51 to 54 have a function of adjusting the resonance frequencies of the drive vibration arms 44 to 47. The weights 55 and 56 have a function of adjusting the resonance frequencies of the detection vibration arms 48 and 49.

As illustrated in FIG. 3B, the weights 51 to 54 include a pair of weight ends aligned along the Y axis, which is the extending direction of the drive vibration arms 44 to 47. Each weight end of the weights 51 to 54 includes weight tip ends 51ab, 52ab, 53ab, and 54ab as first weight ends, and weight base ends 51aa, 52aa, 53aa, and 54aa as second weight ends located at positions closer than the weight tip ends 51ab, 52ab, 53ab, and 54ab with the coupling arms 42 and 43 forming the base 41 as a reference.

The weights 51 to 54 illustrated in FIGS. 3A and 3B illustrate a state after the resonance frequencies of the drive vibration arms 44 to 47 are adjusted as described later.

Therefore, a portion of the weights 51 to 54 are removed or thinned. Therefore, the weight portion 441 includes a processing mark 511 formed by removing a portion of the weight 51 or by thinning a portion of the weight 51 in the thickness direction of the drive vibration arm 44. In addition, the weight portion 451 includes a processing mark 521 formed by removing a portion of the weight 52 or by thinning a portion of the weight 52 in the thickness direction of the drive vibration arm 45. In addition, the weight portion 461 includes a processing mark 531 formed by removing a portion of the weight 53 or by thinning a portion of the weight 53 in the thickness direction of the drive vibration arm 46. In addition, the weight portion 471 includes a processing mark 541 formed by removing a portion of the weight 54 or by thinning a portion of the weight 54 in the thickness direction of the drive vibration arm 47. By removing a portion of the weights 51 to 54 in this manner, the resonance frequencies of the drive vibration arms 44 to 47 can be appropriately adjusted. The processing marks 511, 521, 531, and 541 may be formed as necessary, and at least one or all of these may be omitted when adjusting the resonance frequency.

Each of the processing marks 511, 521, 531, and 541 includes processing mark tip ends 511b, 521b, 531b, and 541b as first processing ends aligned along the Y axis which is the extending direction of the drive vibration arms 44 to 47, and processing mark base ends 511a, 521a, 531a, and 541a as second processing ends. The processing mark tip ends 511b, 521b, 531b, and 541b overlap respectively the weight tip ends 51ab, 52ab, 53ab, and 54ab of the weights 51 to 54 in the extending direction of the drive vibration arms 44 to 47, and the drive vibration arms in plan view as viewed from the thickness direction of the drive vibration arms 44 to 47. In addition, in the specific shapes of the processing marks 511, 521, 531, and 541 in this embodiment, the widths in the direction along the X axis of the processing mark base ends 511a, 521a, 531a, and 541a are substantially the same as the widths in the direction along the X axis of the weights 51 to 54. The center portions of the direction along the X axis of the processing mark tip ends 511b, 521b, 531b, and 541b have a so-called recessed shape that is recessed in the direction toward the base 41. In other words, in each of the processing marks 511, 521, 531, and 541, the widths in the direction along the X axis of the processing mark tip ends 511b, 521b, 531b, and 541b are configured to be smaller than the widths in the direction along the X axis of the processing mark base ends 511a, 521a, 531a, and 541a.

The constituent material of the weights 51 to 56 is not particularly limited. For example, a metal (metal material), an inorganic compound, a resin, or the like can be used, and the metal or the inorganic compound is preferably used. The metal or the inorganic compound can be formed easily and with high accuracy by a vapor film formation method. In addition, the weights 51 to 56 made of a metal or an inorganic compound can be efficiently and accurately removed by irradiation with energy rays. Therefore, by forming the weight pattern 5 with a metal or an inorganic compound, the frequency adjustment described later is more efficient and highly accurate.

Examples of such metal materials include single substance such as nickel (Ni), gold (Au), platinum (Pt), aluminum (Al), silver (Ag), chromium (Cr), copper (Cu), molybdenum (Mo), niobium (Nb), tungsten (W), iron (Fe), titanium (Ti), cobalt (Co), zinc (Zn), zirconium (Zr), or an alloy containing at least one of these, and one type or a combination of two or more types can be used. Among these, from the viewpoint that it can be collectively formed with the drive electrode or the detection electrode, it is preferable to use Al, Cr, Fe, Ni, Cu, Ag, Au, Pt, or an alloy containing at least one of these as the metal material.

In addition, examples of such inorganic compounds include oxide ceramics such as aluminum oxide (alumina), silicon oxide (silica), titanium oxide (titania), zirconia, yttria, or calcium phosphate, nitride ceramics such as silicon nitride, aluminum nitride, titanium nitride, or boron nitride, carbide ceramics such as graphite or tungsten carbide, other ferroelectric materials such as barium titanate, strontium titanate, PZT, PLZT, or PLLZT. Among these, it is preferable to use an insulating material such as silicon oxide ($SiO_2$), titanium oxide ($TiO_2$), or aluminum oxide ($Al_2O_3$).

Specifically, the weights 51 to 56 preferably have a structure in which, for example, an upper layer containing gold (Au) is laminated on abase layer containing chromium (Cr). As a result, adhesion to the vibrating body 4 formed using quartz is excellent, and the resonance frequency can be adjusted with high accuracy and efficiency.

In addition, the average thickness of each of the weights 51 to 56 is not particularly limited, and is, for example, approximately 10 nm to 10,000 nm.

In the vibration element 1 described above, when an electric field is generated between the drive signal electrode to which the drive signal is input and the drive ground electrode in a state where the angular velocity is not applied to the vibration element 1, each of the drive vibration arms 44 to 47 performs flexural vibration, that is, drive vibration in a direction indicated by an arrow α in FIG. 3A. At this time, since the drive vibration arms 44 and 45 and the drive vibration arms 46 and 47 perform symmetrical vibration in FIG. 3A, the base 41 and the detection vibration arms 48 and 49 hardly vibrate.

When the angular velocity ω around the axis a along the Z axis is applied to the vibration element 1 in the state of performing the drive vibration, detection vibration, that is, detection mode vibration is excited. Specifically, the Coriolis force in the direction indicated by the arrow γ in FIG. 3A acts on the drive vibration arms 44 to 47 and the coupling arms 42 and 43 to excite new vibrations. Accordingly, detection vibration in the direction indicated by arrow β in FIG. 3A is excited in the detection vibration arms 48 and 49 so as to cancel the vibrations of the coupling arms 42 and 43. Electric charge generated in the detection vibration arms 48 and 49 by this detection vibration is taken out as a detection signal from the detection signal electrode, and the angular velocity ω is obtained based on the detection signal.

In the vibration element 1 described above, the weights 51 to 54 are provided with a pair of weight ends aligned along the Y axis that is the extending direction of the drive vibration arms 44 to 47. Each of the weight ends includes the weight tip ends 51ab, 52ab, 53ab, and 54ab as the first weight ends, and the weight base ends 51aa, 52aa, 53aa, and 54aa as the second weight ends located at positions closer than the weight tip ends 51ab, 52ab, 53ab, and 54ab with the coupling arms 42, 43 constituting the base 41 as a reference. In addition, each of the processing marks 511, 521, 531 and 541 provided at the weights 51 to 54 includes the processing mark tip ends 511b, 521b, 531b, and 541b as the first processing ends, and the processing mark base ends 511a, 521a, 531a, and 541a as the second processing ends aligned along the Y axis that is the extending direction of the drive vibration arms 44 to 47. The processing mark tip ends 511b, 521b, 531b, and 541b overlap the respective weight tip ends 51ab, 52ab, 53ab, and 54ab of the weights 51 to 54 in plan view in the extending direction of the drive vibration arms 44 to 47. In addition, each of the processing marks 511, 521, 531, and 541 is configured such that the width in the direction along the X axis of the processing mark tip ends 511b, 521b, 531b, and 541b is smaller than the width in the direction along the X axis of the processing mark base ends 511a, 521a, 531a, and 541a. In such processing marks 511, 521, 531, and 541, according to the vibration element 1 provided in the weights 51 to 54, in a frequency adjustment step in which the processing marks 511, 521, 531, and 541 are formed, even when the positions of the processing marks 511, 521, 531 and 541 vary in the extending direction of the drive vibration arms 44 to 47, variations in the center of gravity position of the weights 51 to 54 can be reduced. In addition, as a result, variations in the frequency adjustment rate can be reduced and the adjustment accuracy can be improved, so that the adjustment time can be shortened.

3. Method of Manufacturing Physical Quantity Sensor

Figure 5:
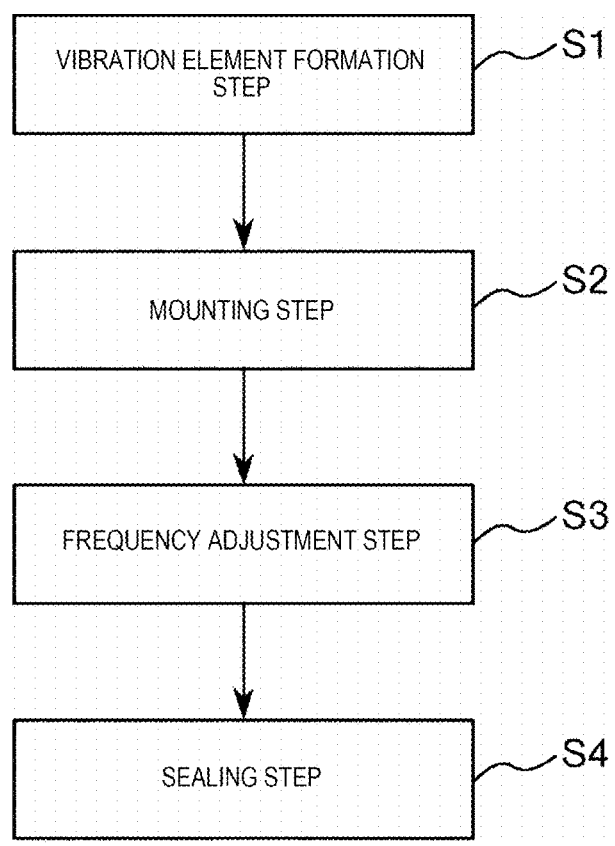
FIG. 5 is a flowchart for describing an example of a method of manufacturing the physical quantity sensor provided with the vibration element.

Next, a method of manufacturing a physical quantity sensor including a method of manufacturing a vibration element will be described by taking the case of manufacturing the physical quantity sensor 10 described above as an example. FIG. 5 is a flowchart for describing an example of a method of manufacturing the physical quantity sensor provided with the vibration element.

As illustrated in FIG. 5, the method of manufacturing the physical quantity sensor 10 includes: [1] a vibration element formation step (Step S1), [2] a mounting step (Step S2), and [3] a frequency adjustment step (Step S3), and [4] a sealing step (Step S4). Here, the method of manufacturing the physical quantity sensor 10 includes a method of adjusting the frequency of the vibration element 1 and a method of manufacturing the vibration element 1. The method of adjusting the frequency of the vibration element 1 includes at least the [3] step among the above steps [1] to [4]. The method of manufacturing the vibration element 1 includes at least the [1] step and the [3] step among the above [1] to [4] steps. Hereinafter, although each step is described sequentially, the component of the physical quantity sensor 10 described with reference to FIG. 1 in the above is described using the same name and the same reference numerals.

[1] Vibration Element Formation Step (Step S1)

Figure 6:
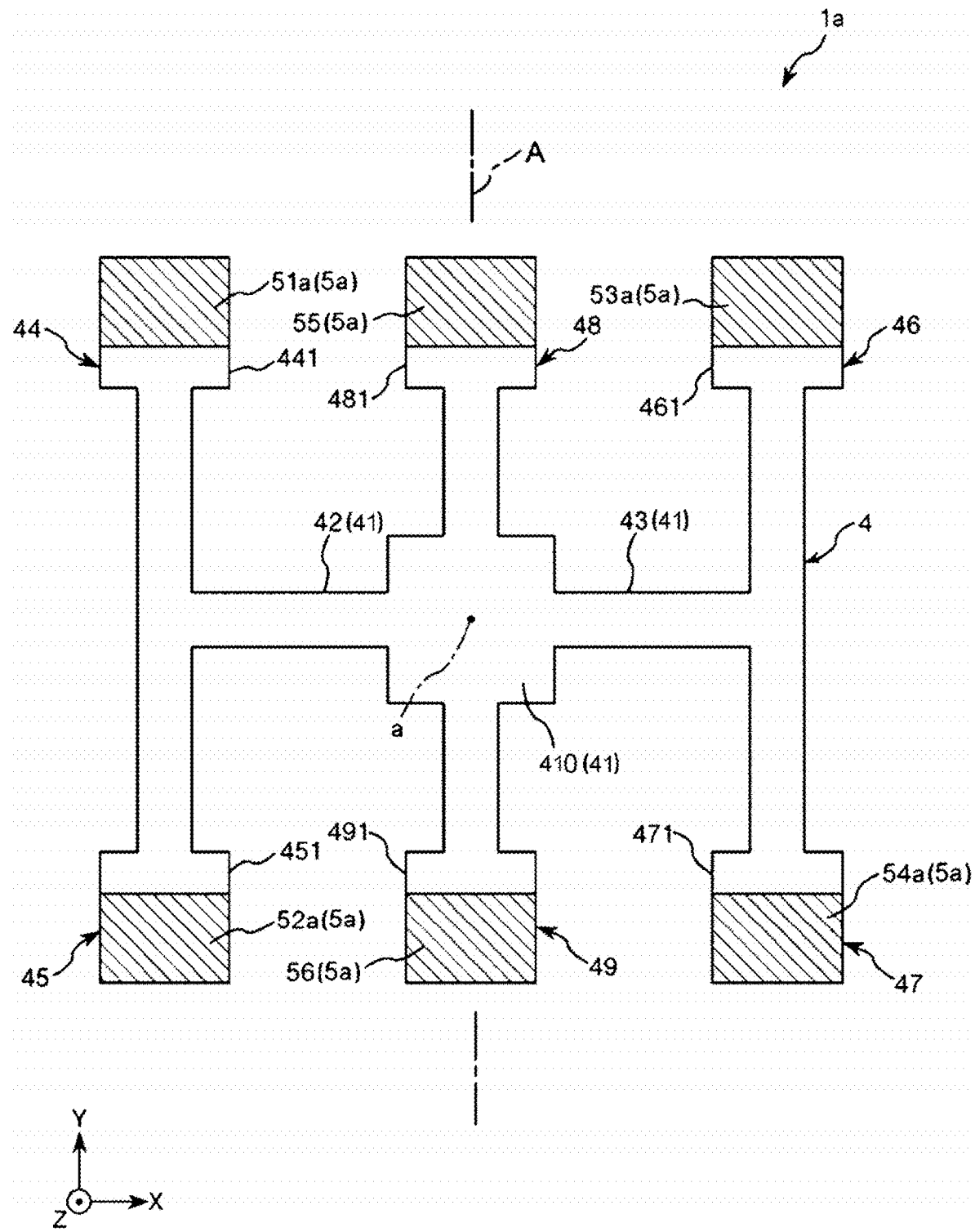
FIG. 6 is a top view of the vibration element obtained through a vibration element formation step.

FIG. 6 is a top view of the vibration element obtained through a vibration element formation step. In addition, FIG. 7 is a bottom view of the vibration element obtained through the vibration element formation step.

Figure 7:
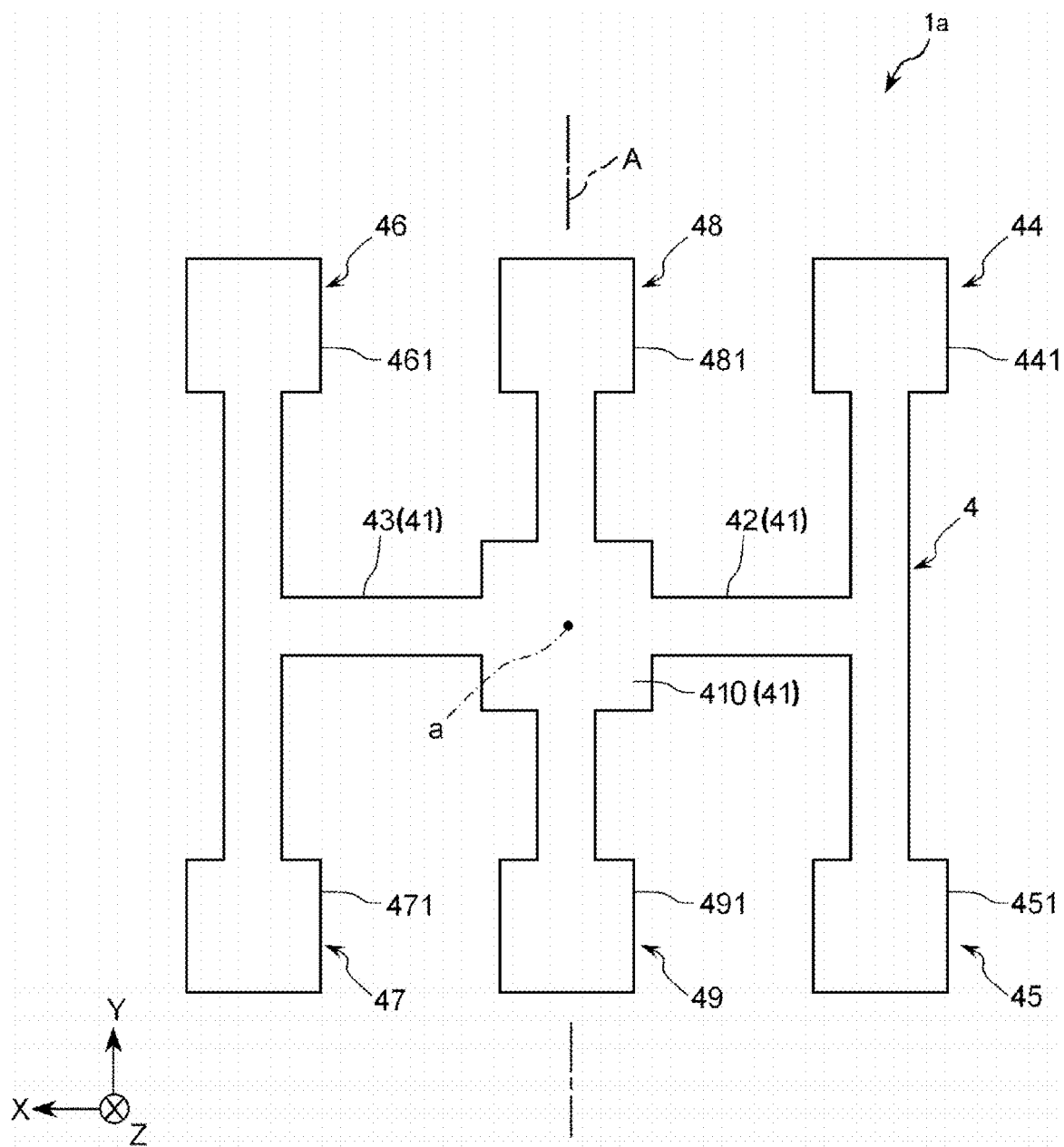
FIG. 7 is a bottom view of the vibration element obtained through the vibration element formation step.

First, a vibration element 1a illustrated in FIGS. 6 and 7 is formed as a vibration element before frequency adjustment. In this step, as illustrated in FIG. 6, the vibration element 1a is formed which is provided with a weight pattern 5a including the weights 51a, 52a, 53a, and 54a before the processing marks 511, 521, 531, and 541 are formed, and the weights 55 and 56.

Specifically, for example, first, a quartz substrate that is a base material of the vibrating body 4 is prepared, a photoresist is applied on one surface of the quartz substrate, and exposure and development on a shape corresponding to the vibrating body 4 are performed. Therefore, a resist mask (not illustrated) is obtained. Next, for example, a Cr layer and an Au layer are formed in this order by a vapor deposition method, a sputtering method or the like on both sides of the quartz substrate with the resist mask formed, and a Ni layer is formed on the Au layer by, for example, a plating method. Thereafter, the resist mask is removed by, for example, etching, to obtain a mask.

Next, the quartz substrate is dry-etched through reactive ion etching RIE using, for example, $C_4F_8$ as an etching gas through the mask from one surface side of the quartz substrate. As a result, the vibrating body 4 is formed. At this stage, the vibrating body 4 is in a state of being coupled to other portion of the quartz substrate, that is, a "wafer state". In this wafer state, the vibrating body 4 is coupled to the other portion of the quartz substrate through a folding portion in which at least one of the width and the thickness is formed to be small and weak. In addition, a plurality of vibration elements 1 can be collectively formed on the quartz substrate in the wafer state.

Thereafter, a metal film is uniformly formed on the surface of the vibrating body 4 by a film forming apparatus such as sputtering, for example. After a photoresist is applied, and exposure and development are performed to obtain the resist mask, the portion of the metal film exposed from the resist mask is removed using an etching solution. As a result, an electrode film pattern is formed. Next, the weight pattern 5a is formed on the electrode film pattern by, for example, a mask vapor deposition.

The vibration element 1a is formed as described above.

After forming the vibration element 1a, when necessary, a detuning frequency adjustment step of adjusting a detuning frequency that is a difference between the resonance frequencies of the detection vibration arms 48 and 49 and the resonance frequencies of the drive vibration arms 44 to 47 can be performed. In the detuning frequency adjustment step, for example, the resonance frequencies of the detection vibration arms 48 and 49 and the drive vibration arms 44 to 47 are measured, and at least a portion of the weights 55 and 56 is removed based on the measurement result. In some cases, a portion of the weights 51a, 52a, 53a, and 54a of the drive vibration arms 44 to 47 may be removed. As a result, the resonance frequencies of the detection vibration arms 48 and 49 or the resonance frequencies of the drive vibration arms 44 to 47 can be adjusted, and the detuning frequency can be adjusted. In addition, this step may be a step of preparing a vibration element 1a formed by another method.

[2] Mounting Step (Step S2)

Next, although not illustrated, the vibration element 1a in a wafer state is separated from the quartz substrate. This is, for example, a process of folding the folding portion. The vibration element 1a is mounted on the base 111 of the package 11 described above (refer to FIG. 1). In this step, the lid 112 is not bonded to the base 111. In addition, in this step, the circuit element 14 is fixed to the lower step surface of the recessed portion of the base 111 with the adhesive 16, and the wiring pattern 13 is coupled to a plurality of coupling terminals (refer to FIG. 1) provided at the upper step surface of the recessed portion of the base 111 by the conductive adhesive 17.

[3] Frequency Adjustment Step (Step S3)

Next, a portion of the weights 51a to 54a is removed and the amount of vibration leakage is adjusted so that the resonance frequencies of the drive vibration arms 44 to 47 are equal to each other. Here, the "amount of vibration leakage" refers to the magnitude of the signal output from the detection vibration arms 48 and 49, that is, the offset or zero point signal, when the drive vibration arms 44 to 47 are driven to vibrate and no rotation is applied.

Figure 8A:
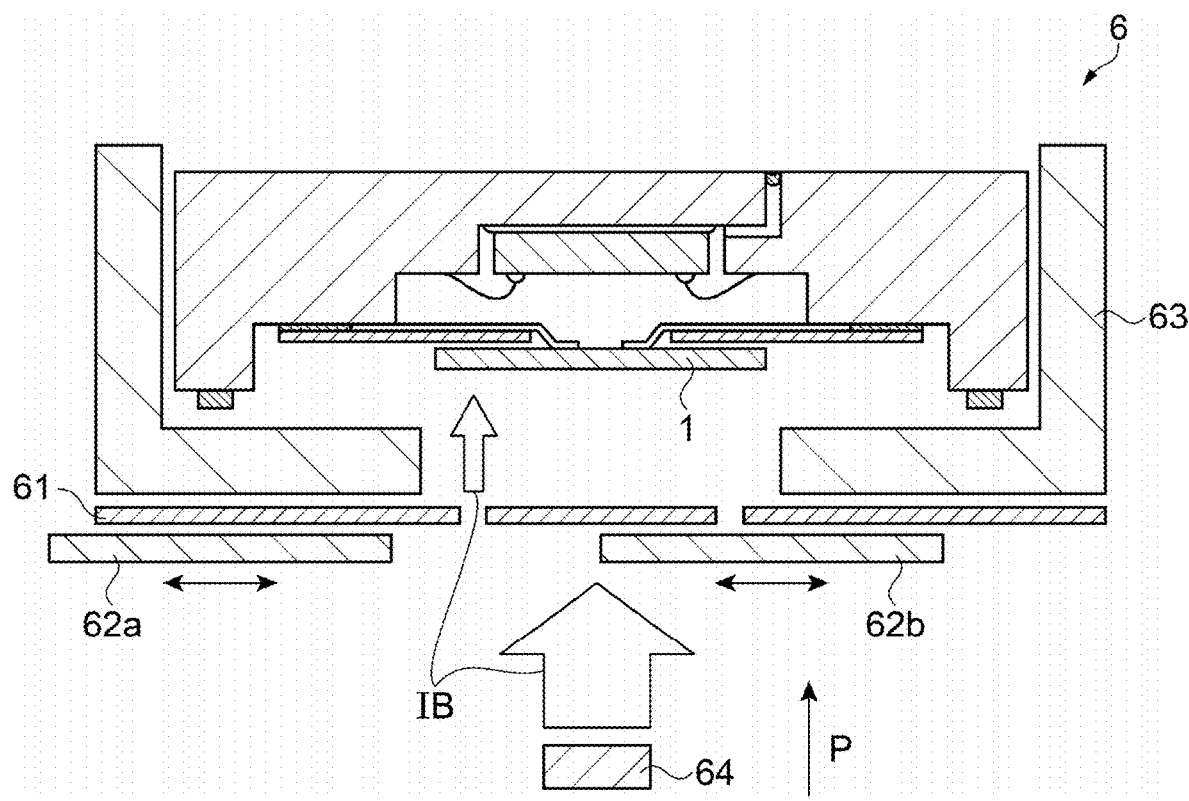
FIG. 8A is a configuration diagram of a cross section of a frequency adjustment device.
Figure 8B:
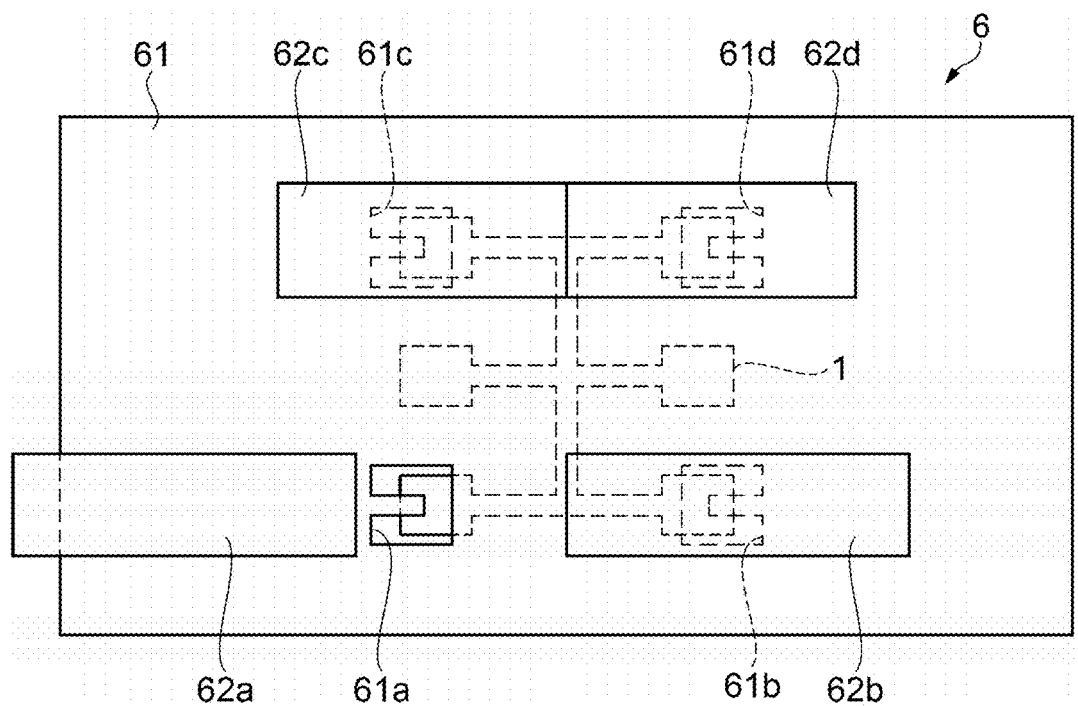
FIG. 8B illustrates a configuration of the frequency adjustment device, and is a plan view from a P direction illustrated in FIG. 8A.

FIG. 8A is a configuration diagram of a cross section of a frequency adjustment device. FIG. 8B illustrates a configuration of the frequency adjustment device in the frequency adjustment step according to the present embodiment, and is a plan view from a P direction illustrated in FIG. 8A. The plan view of FIG. 8B is a view of the vibration element 1, a mask 61, and a shutter 62, viewed from the direction of an ion beam irradiation portion 64, for example, an ion gun in a frequency adjustment device 6. In addition, in FIG. 8B, a tray 63 on the flat plate is not illustrated because the tray is hidden by the mask 61 when viewed from the ion beam irradiation side.

As illustrated in FIGS. 8A and 8B, the frequency adjustment device 6 is provided with an ion beam irradiation portion 64, a plate-like tray 63 on which the vibration element 1 can be placed, disposed on a side irradiated with the ion beam from the ion beam irradiation portion 64, a mask 61 fixedly disposed between the ion beam irradiation portion 64 and the tray 63, mask openings 61a, 61b, 61c, and 61d provided in the mask 61, and shutters 62a, 62b, 62c, and 62d movably disposed between the mask 61 and the ion beam irradiation portion 64. Here, the shutter 62a is provided corresponding to the mask opening 61a, the shutter 62b is provided corresponding to the mask opening 61b, the shutter 62c is provided corresponding to the mask opening 61c, and the shutter 62d is provided corresponding to the mask opening 61d.

The mask openings 61a, 61b, 61c and 61d of the mask 61 are provided corresponding to the positions of the weights 51 to 54 (refer to FIG. 3B) of each of the drive vibration arms 44 to 47 (refer to FIG. 3B) of the vibration element 1. For example, the position is an area located on the tip end side of the upper surface of the weight portions 441, 451, 461, and 471 (refer to FIG. 3B).

The shutters 62a, 62b, 62c, and 62d move so as to open and close the mask openings 61a, 61b, 61c, and 61d. For example, as illustrated in FIG. 8A, in a state where the shutter 62a moves away from the mask opening 61a and the mask opening 61a is exposed on the ion beam irradiation portion 64 side, that is, in a shutter open state, the ion beam IB from the ion beam irradiation portion 64 reaches the weight (not illustrated) of the vibration element 1 through the entire area of the mask opening 61a. On the other hand, when the shutter 62b is located so as to close the mask opening 61b, that is, in a shutter closed state, the ion beam IB from the ion beam irradiation portion 64 does not reach the weight (not illustrated) of the vibration element 1.

Figure 9A:
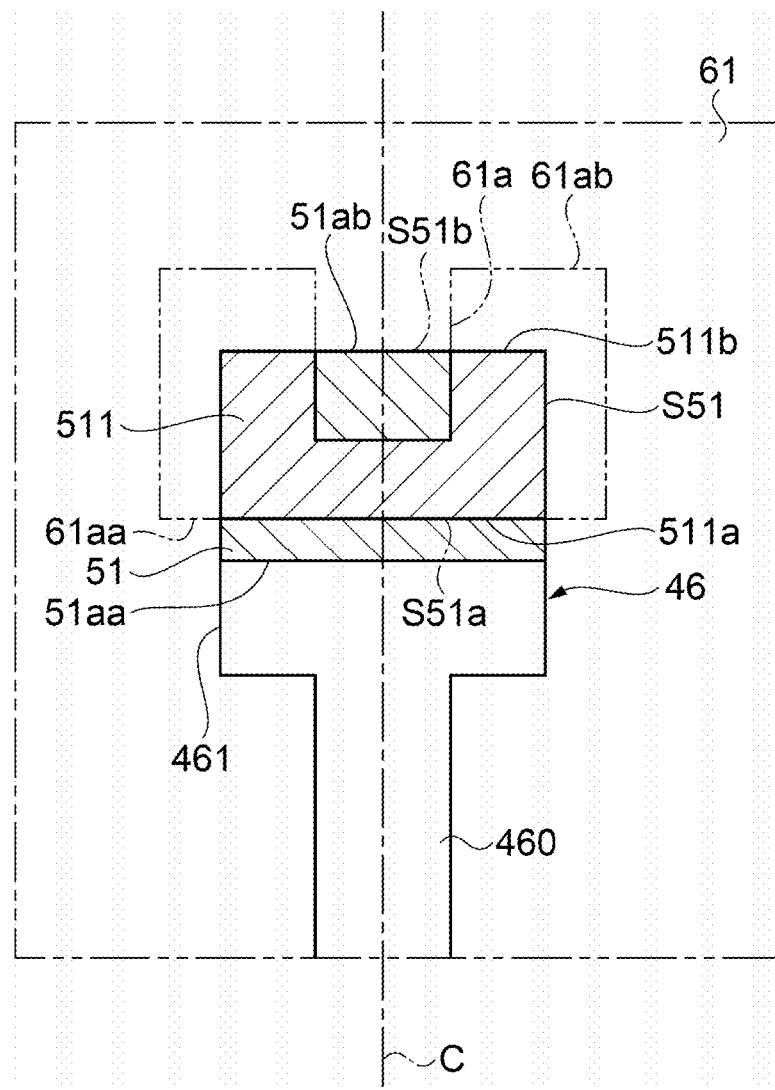
FIG. 9A is a plan view of a vicinity of a mask for describing a shape of a frequency adjustment mask.
Figure 9B:
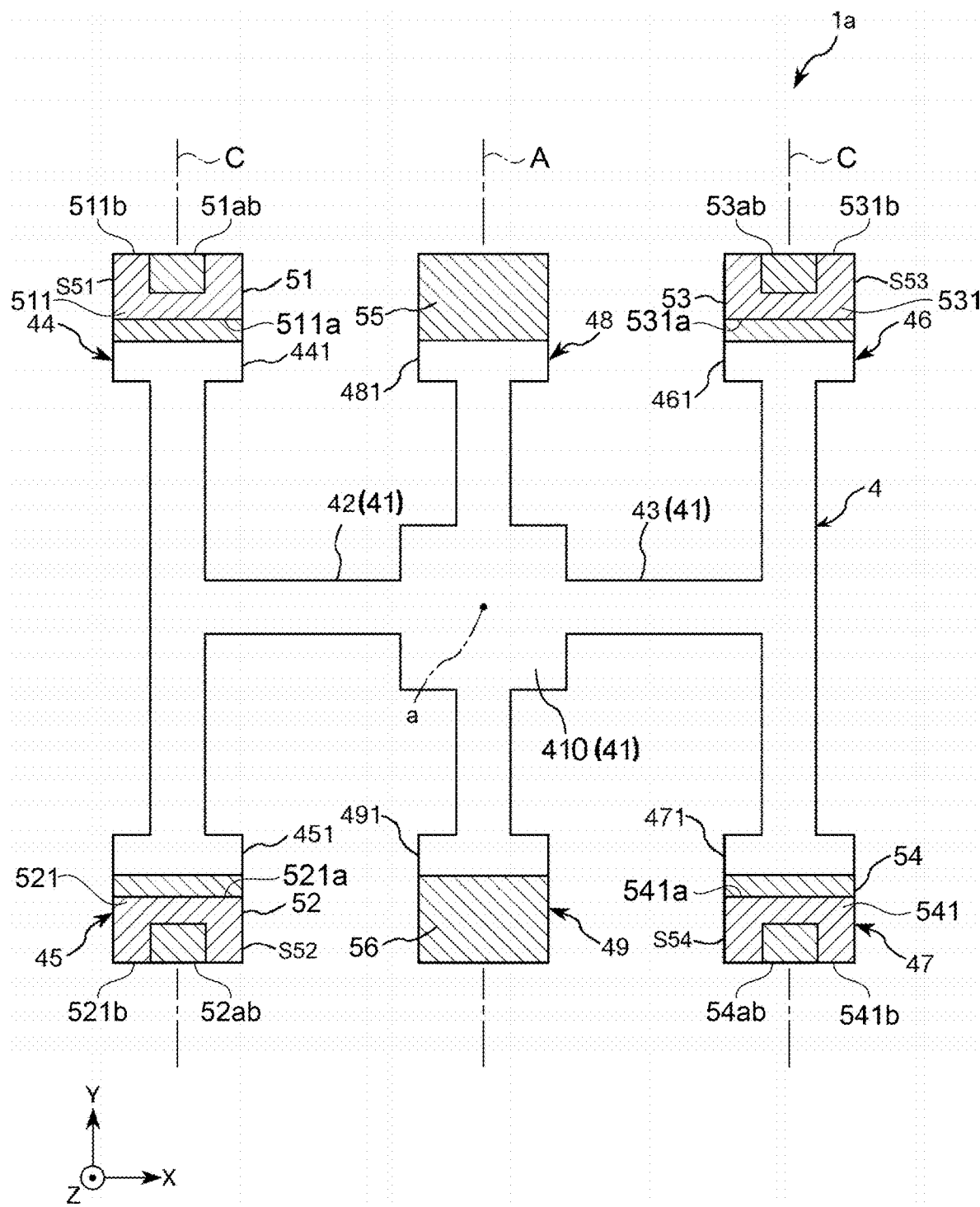
FIG. 9B is a plan view of the vibration element for describing the shape of the frequency adjustment mask.

FIGS. 9A and 9B illustrate the positional relationship between the mask 61 and the mask opening 61a, an energy irradiation area S51, the processing mark, and the weight according to the present embodiment. FIG. 9A is a plan view of a vicinity of a mask for describing a shape of a frequency adjustment mask. FIG. 9B is a plan view of the vibration element for describing the shape of the frequency adjustment mask. FIG. 9A is an enlarged plan view of the vicinity of the weight 51 viewed from the position of the ion beam irradiation portion 64. The shutter 62a (refer to FIG. 8A) is in a state of being separated from the mask opening 61a. The shape of the mask opening 61a is a recessed shape in which the width of a mask opening tip end 61ab is smaller than the width of a mask opening base end 61aa located at a position closer than the mask opening tip end 61ab with the coupling arms 42 and 43 constituting the base 41 as a reference, as illustrated in FIG. 9A. That is, the mask opening tip end 61ab has a recessed shape in which the central portion in the width direction along the X axis is recessed in the direction of the coupling arms 42 and 43.

In the present embodiment, since the tip end 61ab of the mask opening 61a opens larger in the direction opposite to the coupling arms 42 and 43 than the weight tip end 51ab, an energy irradiation area tip end S51b of the energy irradiation area S51 overlaps the weight tip end 51ab in plan view. In addition, since a rear end 61aa on a base side of the mask opening 61a is located in the area of the weight 51, the energy irradiation area base end S51a does not overlap the weight base end 51aa in plan view. That is, the energy irradiation area base end S51a is located in the area of the weight 51.

Therefore, an ion beam (not illustrated) passed through the mask 61 has a shape similar to that of the mask opening 61a and reaches the weight 51 in a shape similar to that of the energy irradiation area S51, to form the processing mark 511 (refer to FIG. 3B). The position of the mask opening 61a is formed such that the energy irradiation areas S51, S52, S53, and S54 illustrated in FIG. 9B irradiated with the ion beam passed through the mask opening 61a are, for example, areas located on the tip end sides of the upper surfaces of the weight portions 441, 451, 461, and 471, which are opposite to the coupling arms 42 and 43. In addition, the energy irradiation area S51 and the energy irradiation area S53 are preferably in positions symmetrical with each other when the line segment A passing through the center of the base main body 410 is set as the symmetry axis. Similarly, the energy irradiation area S52 and the energy irradiation area S54 are preferably in positions symmetrical with each other when the line segment A passing through the center of the base main body 410 is set as the symmetry axis. In addition, the energy irradiation areas S51 to S54 preferably have the same shape and the same area as each other in plan view.

The frequency adjustment device 6 having such a configuration adjusts the frequency of the vibration element 1 in the following procedure.

In this step, first, the resonance frequencies of the drive vibration arms 44 to 47 are measured. Next, the amounts of removal of the drive vibration arm removing the weight and the weight are calculated from the measured resonance frequency, the target resonance frequency, and the adjustment rate that is the amount of change in frequency with respect to the amount of removal of the weight. Here, the weight for irradiating the ion beam and the irradiation time, that is, the shutter to be "open" and the "open" time among the four shutters 62a, 62b, 62c, and 62d, are calculated. In this description, an example in which the shutter 62a facing the weight 51a of the drive vibration arm 44 is determined as the shutter to be "open" among the four shutters 62a, 62b, 62c, and 62d.

Next, the determined shutter 62a is opened for the calculated time based on the calculation result, so that the ion beam having the shape of the mask opening 61a reaches the weight 51a of the drive vibration arm 46, and a portion of the weights 51a is thinned or removed. As a result, the processing mark 511 as illustrated in FIG. 3B is formed. Similarly, the processing marks 521, 531, and 541 are also formed in the other drive vibration arms 45, 46, and 47, respectively. As a result, the mass of the weights 51a to 54a is reduced, and the resonance frequencies of the drive vibration arms 44 to 47 can be adjusted. By repeating this step, the resonance frequency of the vibration element 1 can be adjusted to a desired value.

In addition, it is preferable to set the irradiation amount or output of the ion beam for each energy irradiation area S51 to S54 based on the measurement result of the resonance frequencies of the drive vibration arms 44 to 47 and the amount of change in the drive frequency with respect to the processing amount. As a result, the resonance frequencies of the drive vibration arms 44 to 47 can be adjusted with high accuracy.

In the present embodiment, as illustrated in FIG. 9B, the processing marks 511, 521, 531 and 541 of each of the weights 51 to 54 by the ion beam are formed in substantially the same shape as the energy irradiation areas S51 to S54.

Therefore, the widths along the X axis of each of the processing mark tip ends 511b, 521b, 531b, and 541b are smaller than each of the processing mark base ends 511a, 521a, 531a, and 541a. In addition, each of the processing mark tip ends 511b, 521b, 531b, and 541b overlaps each of the weight tip ends 51ab, 52ab, 53ab, and 54ab in plan view. In addition, each of the processing mark base ends 511a, 521a, 531a, and 541a is located in the weight area. Each of the processing marks 511, 521, 531, and 541 has a rectangular shape of the base including each of the processing mark base ends 511a, 521a, 531a, and 541a, and has a shape that is line symmetric with respect to the line segment C passing through the center of each of the weights 51, 52, 53, and 54. Furthermore, each of the processing marks 511, 521, 531, and 541 is located at both ends along the X axis of the rectangular base, has two tip ends extending from the base toward the tip end side, and has a so-called recessed shape formed by the base and two tip ends.

The adjustment of the resonance frequency in this step is related to two factors, that is, a decrease in mass of the weights 51 to 54 due to the thinning or removal of the weights 51 to 54 by the ion beam, and a change in the center of gravity of the weights 51 to 54. Since the drive vibration arms 44 to 47 of the vibration element 1 move like a pendulum, the resonance frequencies decrease as the mass of the weights 51 to 54, which are weights, increases. On the contrary, when the mass is reduced, the resonance frequencies increase. In addition, when the weight effect of the weights 51 to 54 is considered to act on the center of gravity position of the weights 51 to 54, since the center of gravity position changes, the distance from the contact point between the drive vibration arms 44 to 47, which are fixed ends of vibration, and the coupling arms 42 and 43 constituting the base 41 to the center of gravity position changes. Therefore, the moment of inertia changes and the resonance frequency changes. For example, in a case in which the mass of the weights 51 to 54 is the same as each other, when the center of gravity position of the weights 51 to 54 moves to the base side, the moment of inertia decreases and the resonance frequency increases. On the contrary, when the center of gravity positions of the weights 51 to 54 move to the tip end side, the moment of inertia increases and the resonance frequency decreases.

Hereinafter, the relationship between the center of gravity position of the weights 51 to 54 and the processing position will be described in detail. The center of gravity position of the weights 51 to 54 is located substantially at the center of the weights 51 to 54 in a state before processing. By processing, that is, removing, the tip end sides of the weights 51 to 54, the center of gravity position of the weights 51 to 54 moves to the base side. On the other hand, when the base side of the weights 51 to 54 is processed, the center of gravity position of the weights 51 to 54 moves to the tip end side.

Figure 10A:
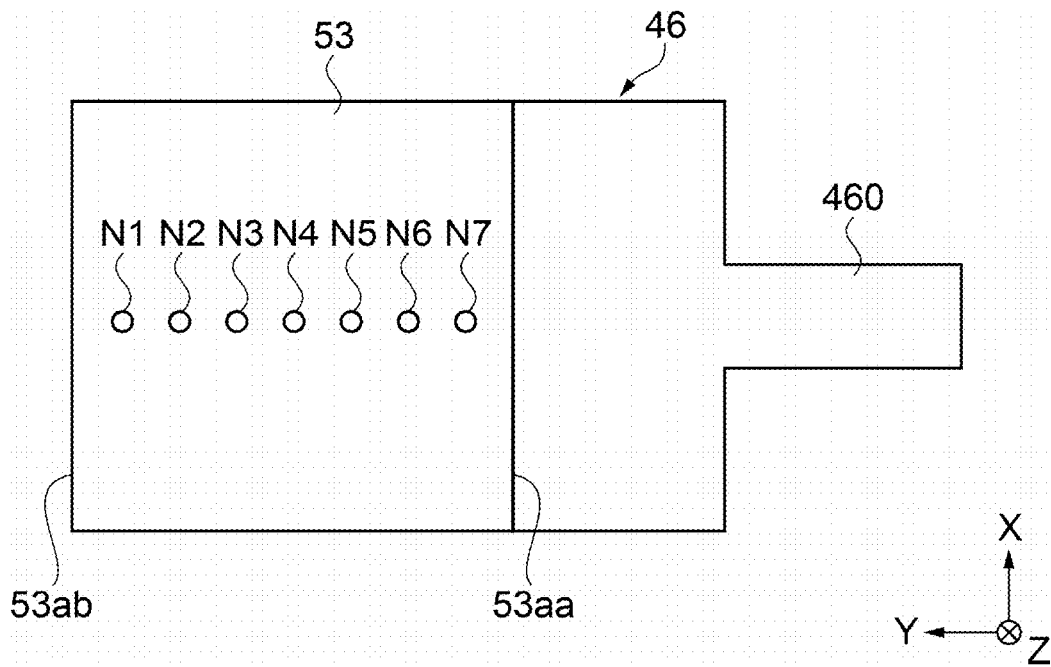
FIG. 10A is an explanatory diagram of an experiment for obtaining a correlation between a processing position and a frequency adjustment rate.
Figure 10B:
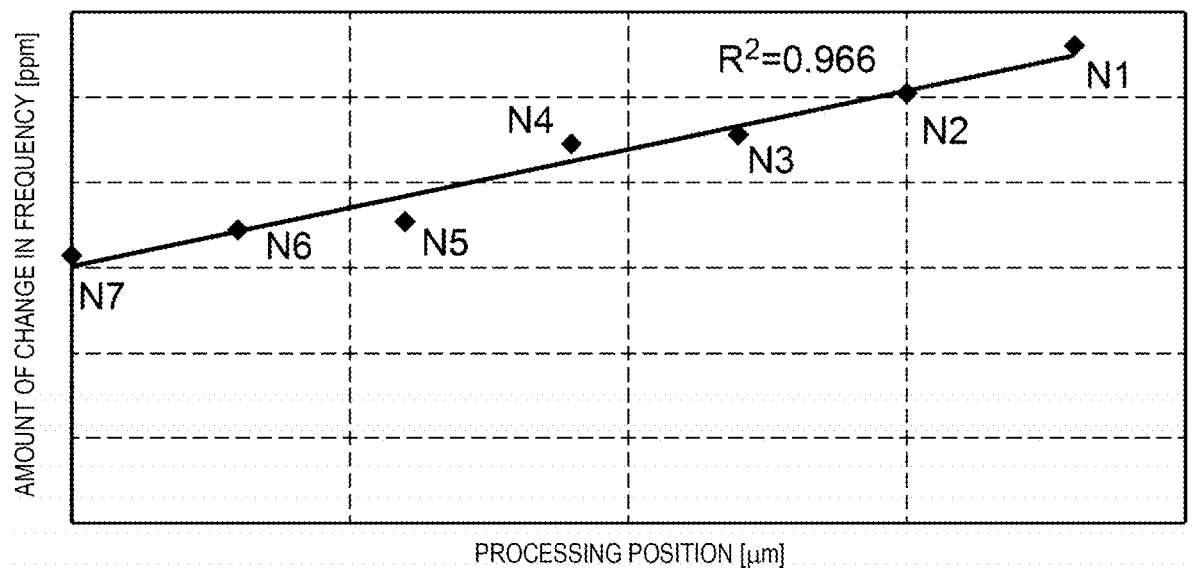
FIG. 10B is a graph illustrating experimental data for describing the correlation between the processing position and the frequency adjustment rate.

FIGS. 10A and 10B illustrate changes in the amount of change in vibration leakage when the processing position for removing the weight 53 is changed under exactly the same processing conditions. In this experiment, since the processing conditions are exactly the same, the amount of mass change of the weight 53 is the same, and only the center of gravity position of the weight 53 is changed by the processing. In addition, when a middle processing point N4 defined as a reference, the distance between each of the points is approximately 8% of the width of the weight 53 in the direction along the Y axis. Here, compared to when the position of the middle processing point N4 was processed, the amount of change in vibration leakage when processing a processing point N1 close to the weight tip end 53ab, which is the tip end of the weight 53 was approximately 1.3 times compared to when processing the processing point N4. The amount of change in vibration leakage when processing a processing point N7 close to the weight base end 53aa of the weight opposite to the weight tip end 53ab of the weight 53 was approximately 0.7 times compared to when processing the processing point N4. In this experiment, the amount of vibration leakage is measured. Since the amount of vibration leakage is a value determined by the balance of the resonance frequency of each of the drive vibration arms 44 to 47, a large amount of change in vibration leakage is synonymous with a large amount of change in resonance frequency. That is, it is clear that the change in the center of gravity position of the weight 53 contributes to the change in the resonance frequency.

In the configuration of the frequency adjustment device of this step, as illustrated in FIG. 8A, the vibration element 1 is placed on the tray 63, and the mask 61 is fixedly disposed between the tray 63 and the shutters 62a, 62b, 62c, and 62d. Therefore, it is difficult to adjust the position of the mask opening 61a in accordance with the weights 51 to 54 of the individual vibration elements 1 placed in the tray 63. In addition, in the individual vibration elements 1, the center of the package 11 and the center of the vibration element do not necessarily coincide with each other due to a dimensional shift in the element formation step and amounting position shift in the mounting step. Furthermore, the shift of the processing position of the apparatus, for example, the positional relationship between the tray 63 and the mask 61 is not necessarily reproduced every time. Therefore, in this step, the position of the mask opening 61a does not necessarily overlap the target position of the weights 51 to 54, and the processing marks 511 to 541 of the individual vibration elements 1 vary with respect to the target processing positions of the weights 51 to 54.

As described above, the center of gravity position of the weights 51 to 54 changes depending on the positions of the processing marks 511 to 541, and the frequency adjustment rate changes. In addition, in this step, the position of the processing mark of the vibration element 1 is changed. Therefore, the frequency adjustment rate of the individual vibration element 1 varies. As a result, in this step of determining the open shutter and calculating the open time from the measured value and the preset adjustment rate, the adjustment rate of the individual vibration element 1 varies, and the resonance frequency after processing is shifted from the target resonance frequency. When the resonance frequency after processing is shifted from the target value, it is required to perform processing again to adjust the frequency, and as a result, it takes time for adjustment.

However, when the mask 61 having the mask opening 61a as in the present embodiment is used, the movement of the center of gravity position of the weight due to the shift of the processing position can be reduced, and variation in the frequency adjustment rate of the vibration element 1 can be suppressed. As a result, the frequency adjustment time of the vibration element 1 can be shortened.

Factors for suppressing the variation in the frequency adjustment rate of the vibration element 1 described above will be described in detail with reference to FIGS. 11A to 11D.

Figure 11A:
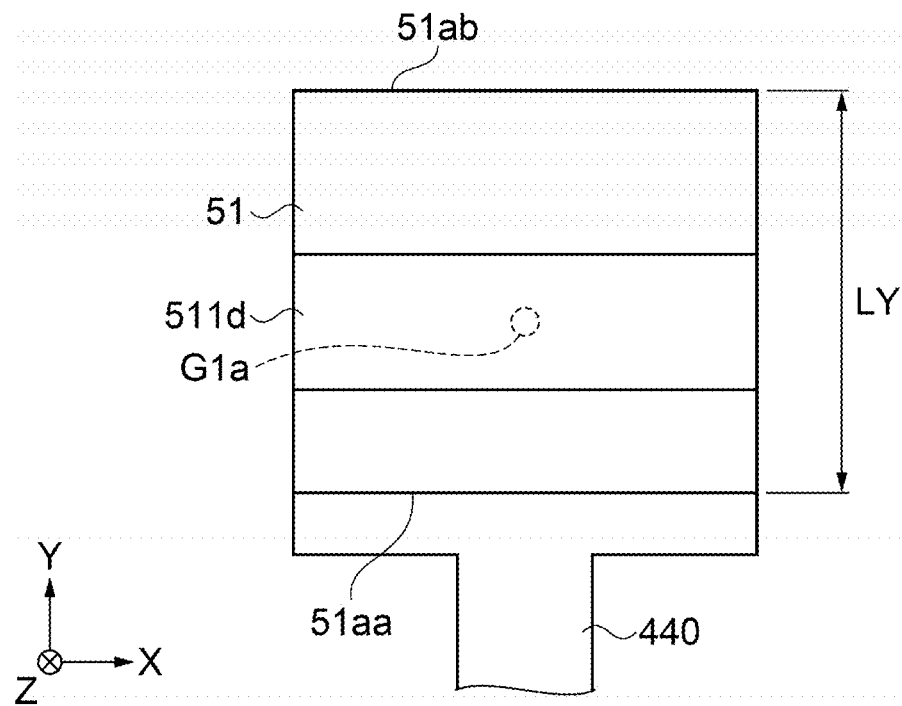
FIG. 11A is a diagram for describing a center of gravity position of the weight after processing when the processing position is not shifted with respect to the weight in the frequency adjustment step.
Figure 11B:
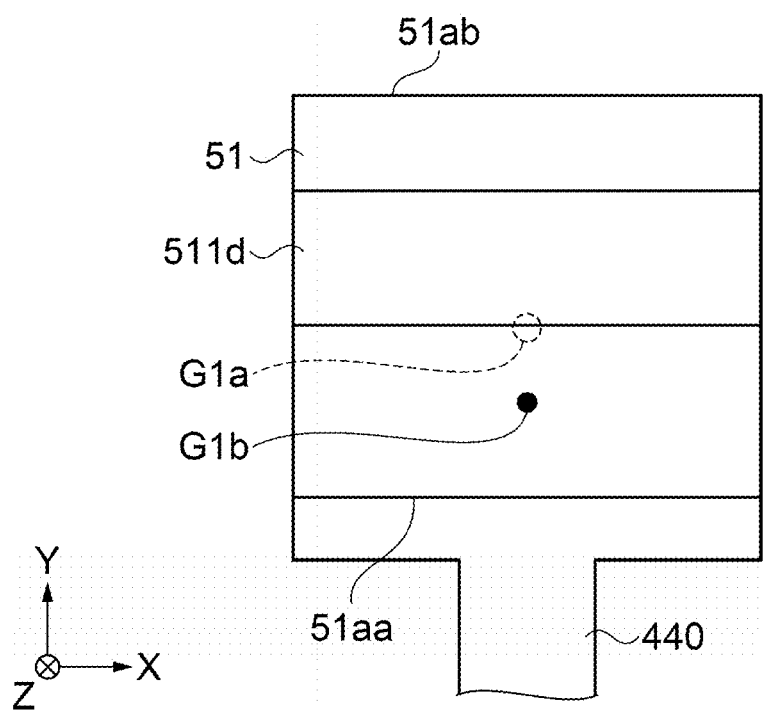
FIG. 11B is a diagram for describing the center of gravity position of the weight after processing when the processing position is shifted with respect to the weight in the frequency adjustment step.

As illustrated in FIG. 11A, for example, in a case in which processing is performed using the mask 61 that can form a square processing mark 511 in which the width in the Y direction of the weight 51 is defined as LY and the width in the Y direction is approximately 26% of LY, when the center of the processing mark 511*d* exactly overlaps the center of the weight 51, and a center of gravity position G1*a* of the weight 51 is calculated, the exact center of the weight 51 is G1*a*. As illustrated in FIG. 11B, when the center of the processing mark 511*d* is shifted from the center of the weight 51 by 13% of LY in the direction along the Y axis, and a center of gravity position G1*b* of the weight 51 is calculated, the center of gravity position G1*b* is shifted from the center of gravity position G1*a* toward the weight base end 51*aa* side by approximately 5% of LY.

Figure 11C:
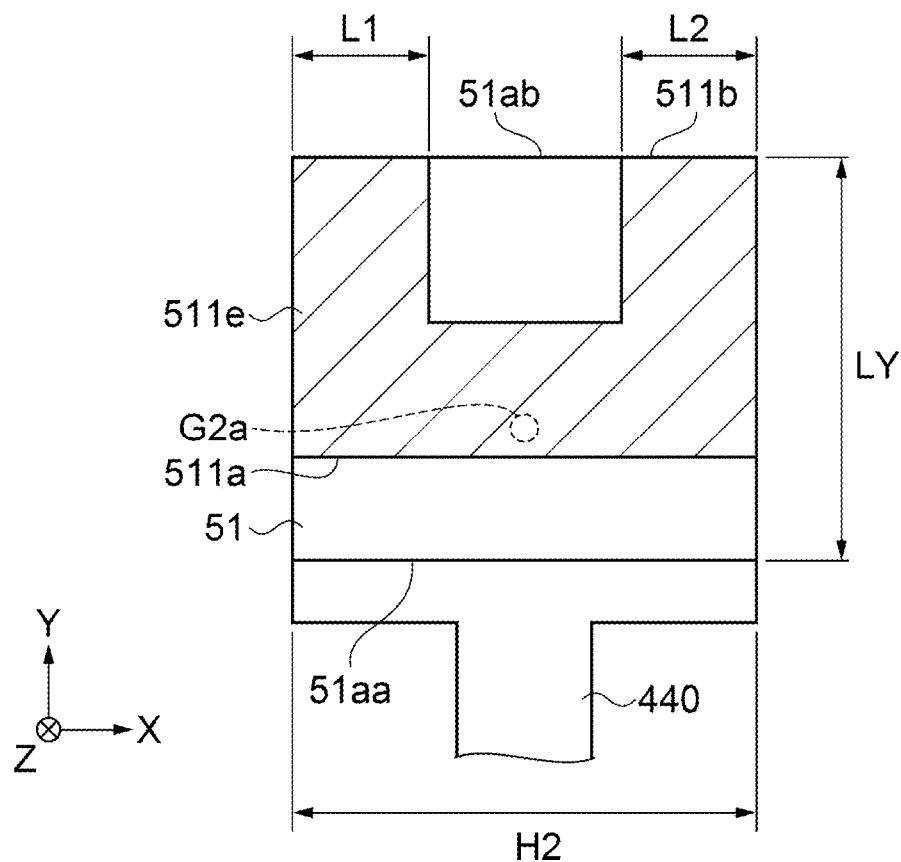
FIG. 11C is a diagram for describing the center of gravity position of the weight after processing when the processing position is not shifted with respect to the weight in the frequency adjustment step.
Figure 11D:
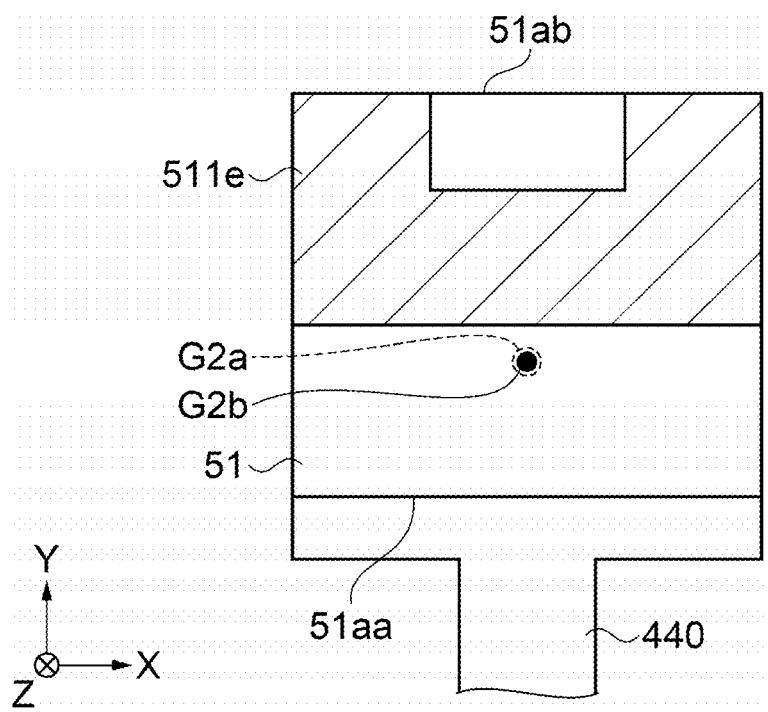
FIG. 11D is a diagram for describing the center of gravity position of the weight after processing when the processing position is shifted with respect to the weight in the frequency adjustment step.

However, by using a mask (not illustrated) as described below, it is possible to reduce the amount of shift of the center of gravity position G1*b* from the center of gravity position G1*a*. More specifically, for example, in the processing mark 511*e* of the present embodiment as illustrated in FIG. 11C, L1+L2, which is the total width of the processing mark tip end 511*b*, is defined as a width H1 of the processing mark tip end 511*b*, and the width of the processing mark base end 511*a* on the base side is defined as a width H2. The processing is performed using a mask (not illustrated) that can form a recessed processing mark 511*e* in which the width H1 is 72% of the width H2. In this case, when the same calculation described above is performed, as illustrated in FIG. 11D, the difference between the center of gravity position G2*a* of the weight 51 when the processing position is not shifted and the center of gravity position G2*b* of the weight 51 when the processing position is shifted by 13% of LY in the Y direction is 1% or less of LY.

As described above, the shift of the center of gravity position of the weight 51 when the processing position is shifted is reduced when using a mask that is the recessed processing mark 511*e* as illustrated in FIG. 11C rather than using a mask (not illustrated) that is the rectangular processing mark 511*d* as illustrated in FIG. 11A. That is, regarding the frequency adjustment rate, when the recessed processing mark 511*e* is formed using the recessed mask as illustrated in FIG. 11C, a change in the adjustment rate due to the shift of the processing position can be reduced. Therefore, by using the mask capable of forming the recessed processing mark 511*e* of the present embodiment, the adjustment accuracy is improved, so that the repetition of processing is reduced and the processing time can be shortened.

Figure 12A:
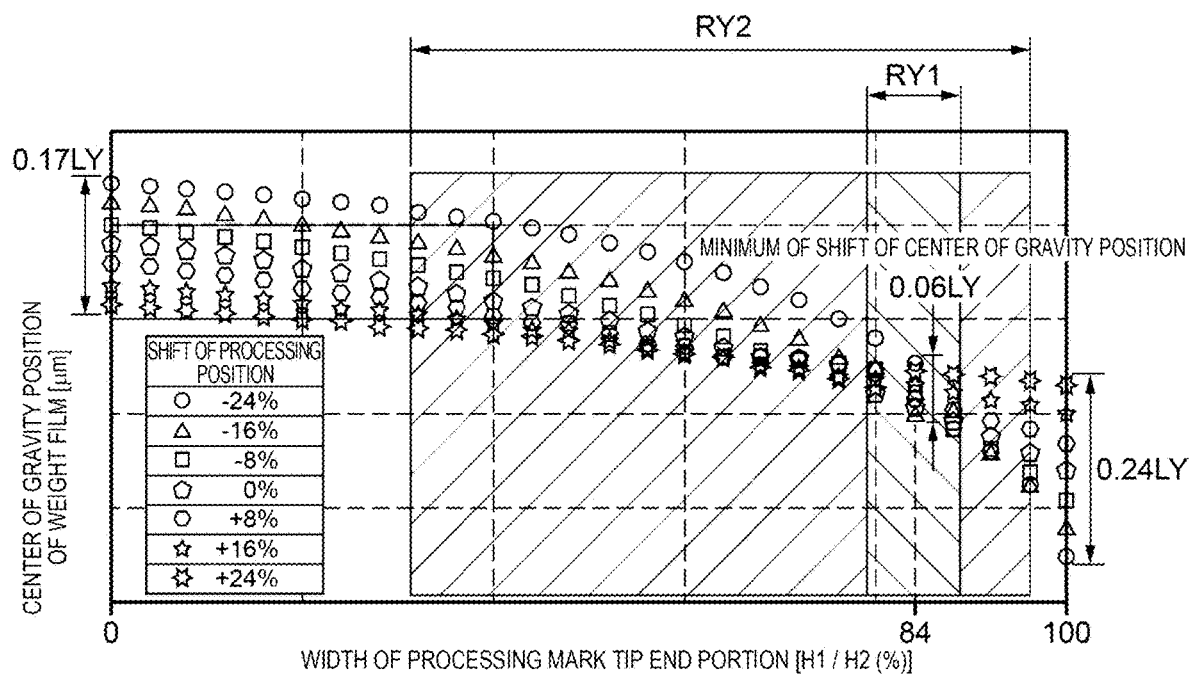
FIG. 12A is a graph of calculation data illustrating that the amount of shift of the center of gravity position of the weight due to the shift of the processing position varies depending on the shape of the processing mark.

In addition, FIG. 12A is a graph in which the centers of gravity position of the weight 51 when the processing positions are shifted in the Y direction by, for example, +24%, +16%, +8%, 0%, −8%, −16%, and −24% of LY, which is the width of the weight 51 illustrated in FIG. 11C in the Y direction, are calculated by changing the width H1 of the processing mark tip end 511*b*. Here, in a case of a square processing mark 511*g* as illustrated in FIG. 12C, the processing position where the amount of shift of the reference center of gravity position is 0% is a position where the center of gravity of the processing mark 511*g* coincides with the center of gravity of the weight 51. In addition, for other shapes of the processing marks illustrated in FIGS. 12B and 12D, the position where the processing mark base end 511*a* of the square processing mark 511*g* illustrated in FIG. 12C and the processing mark base ends 511*a* and 511*a* of the processing marks 511*e* and 511*f* overlap is defined as 0% of the reference.

According to the graph illustrated in FIG. 12A, when processing with the square processing mark 511*g* as illustrated in FIG. 12C is performed, the center of gravity position of the weight 51 when the processing position is shifted by +24% of LY in the Y direction and when the processing position is shifted by −24% of LY in the Y direction is shifted by approximately 17% of LY.

Figure 12B:
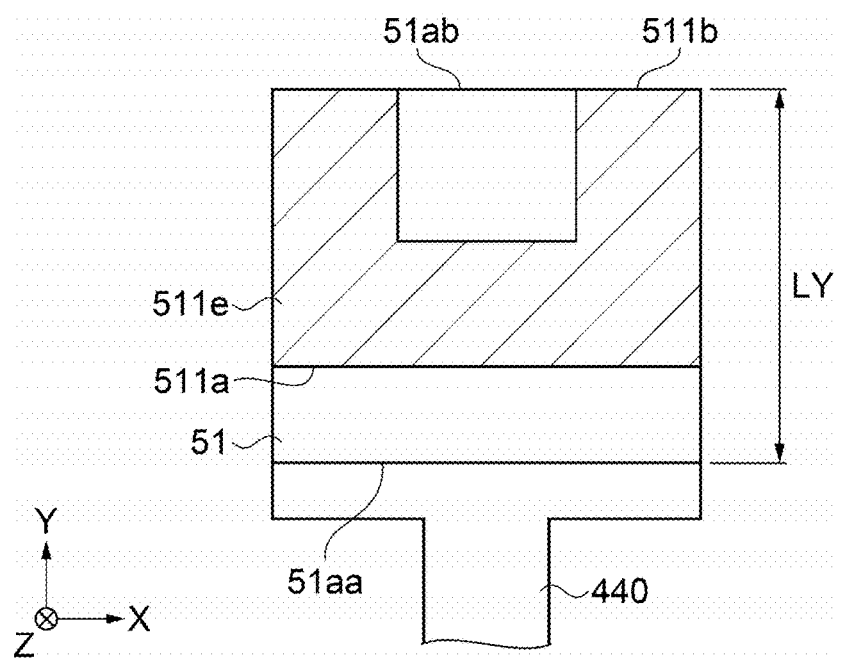
FIG. 12B is a plan view in the case of a recessed shape of the processing mark in the calculation data illustrating that the amount of shift of the center of gravity position of the weight due to the shift of the processing position varies depending on the shape of the processing mark.
Figure 12C:
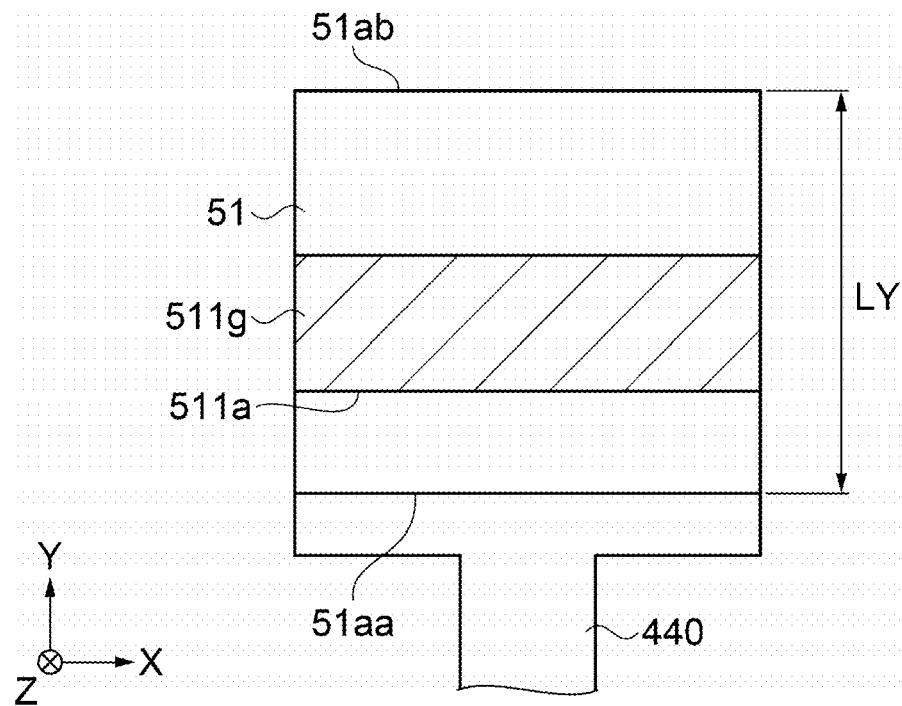
FIG. 12C is a plan view in the case of a square shape of the processing mark in the calculation data illustrating that the amount of shift of the center of gravity position of the weight due to the shift of the processing position varies depending on the shape of the processing mark.
Figure 12D:
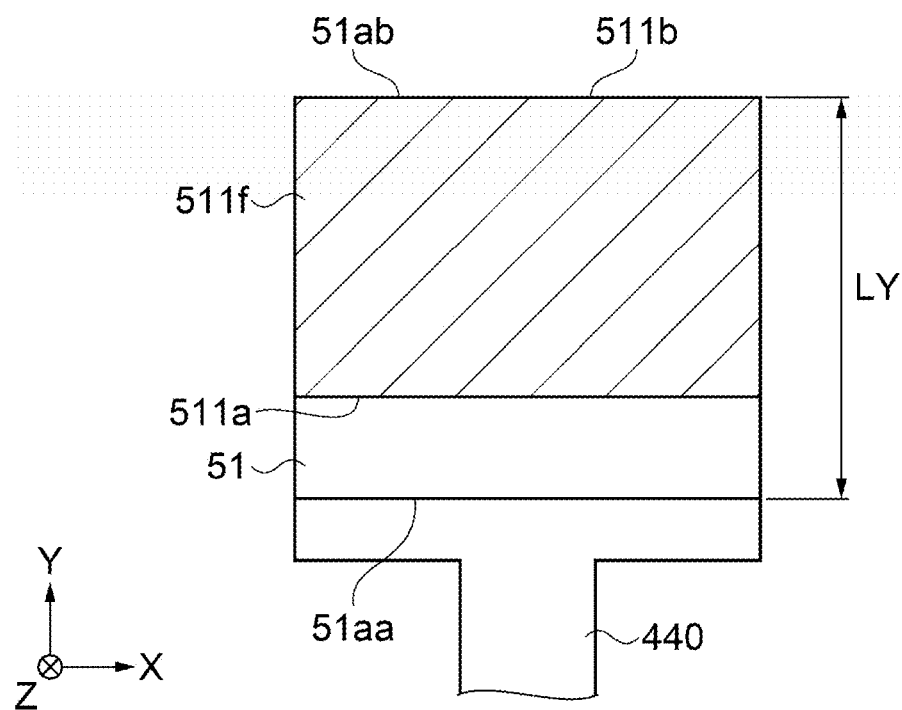
FIG. 12D is a plan view in the case of a square shape of the processing mark in the calculation data illustrating that the amount of shift of the center of gravity position of the weight due to the shift of the processing position varies depending on the shape of the processing mark.

When the width H1 of the processing mark tip end 511*b* is gradually increased from a small state and processing is performed with the recessed processing mark 511*e* illustrated in FIG. 12B, the shift of the center of gravity position when the processing position is shifted gradually decreases. When the width H1 of the processing mark tip end 511*b* is 84% of the width H2 of the processing mark base end 511*a*, the shift of the center of gravity position of the weight 51 is minimized. The shift of the center of gravity position of the weight when the processing position is shifted by +24% of LY in the Y direction and when the processing position is shifted by −24% of LY in the Y direction can be reduced to 6% of LY. Furthermore, when the width H1 of the processing mark tip end 511*b* is increased, the processing mark 511*f* as illustrated in FIG. 12D is finally obtained. At this time, the shift of the center of gravity position of the weight 51 when the processing position is shifted by +24% of LY in the Y direction and when the processing position is shifted by −24% of LY in the Y direction is increased up to 24% of LY.

The number of times of processing when the resonance frequency is adjusted from 40,000 ppm to within ±1,000 ppm is calculated based on the graph illustrated in FIG. 12A. At this time, the adjustment rate used for the calculation is defined as an adjustment rate when the processing position is not shifted, that is, when the amount of shift of the center of gravity position as a reference is 0%, and defined as 4,000 ppm/sec as. In addition, since the area of the processing mark changes as the width H1 of the processing mark tip end 511*b* increases or decreases, although the adjustment rate changes, in order to simplify the calculation, the adjustment rate at the reference position is made constant by adjusting the output of the frequency adjustment device 6 (refer to FIG. 8A). In addition, referring to FIGS. 9A and 9B, as described above, in the frequency adjustment step, a portion of the weights 51 to 54 is removed and the amount of vibration leakage is adjusted so that the resonance frequencies of the drive vibration arms 44 to 47 are equal to each other. In this calculation, a case where the resonance frequencies of the weight 51 and the weight 54 are adjusted will be described as an example.

Figure 13A:
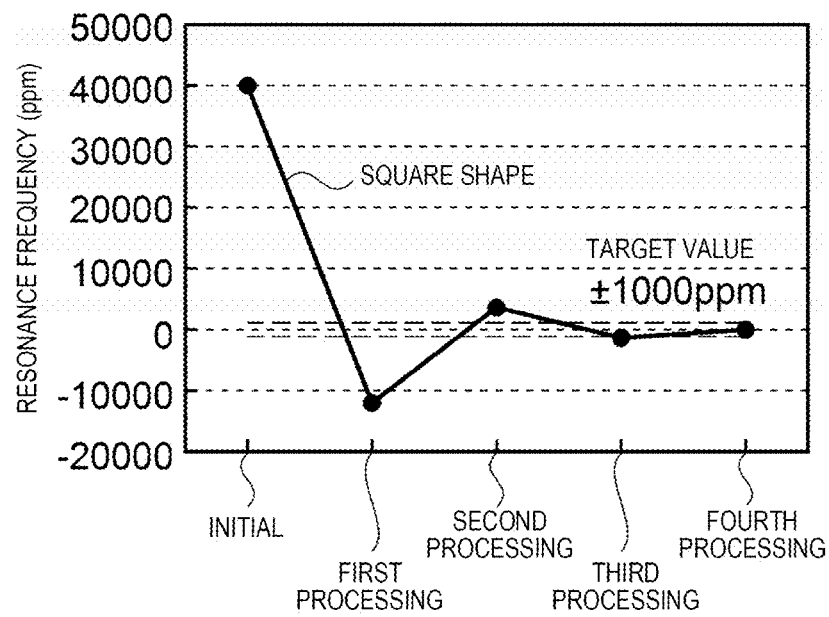
FIG. 13A is calculation data illustrating a processing history example 1 in the frequency adjustment step.

First, assuming the case of a square processing mark as illustrated in FIG. 12C, the adjustment of the resonance frequencies of the weight 51 and the weight 54 will be described with reference to the graph of FIG. 13A. In the case of such a square processing mark, in order to adjust 40,000 ppm, since the processing rate is 4,000 ppm, it is calculated that processing may be performed for 10 seconds. The weight to be processed first is assumed to be the weight 51.

Here, for example, when the processing position is shifted by +24% of LY in the Y direction, the center of gravity position of the weight 51 is calculated so as to shift by approximately −8.4% of LY in the Y direction from the center of gravity position of the weight 51 when the reference position is processed. In addition, from the graph of FIG. 10B, when the processing position is shifted by +24% of LY in the Y direction, since the data interval is approximately 8% of LY, the rate ratio is equivalent to the ratio when N1 is processed and N4 is processed, and the adjustment rate is approximately 1.30 times. That is, since the actual adjustment rate is approximately 5,200 ppm/sec, when processing is performed for 10 seconds, processing with 52,000 ppm is performed, and the resonance frequency after processing is −12,000 ppm with respect to 40,000 ppm before processing.

As described above, when the processing exceeds the target resonance frequency of ±1,000 ppm, the weight 51 cannot be adjusted any more, so that the weight 54 of the drive vibration arm 47 on the opposite side across the detection vibration arm 48 is processed, and the resonance frequency is adjusted. At this time, the setting of the adjustment rate for processing the weight 54 of the drive vibration arm 47 is 4,000 ppm/sec, and the processing time for processing with 12,000 ppm is 3 seconds. However, since the mask opening 61a and the vibration element 1 are fixed, the processing position of the weight 54 is also shifted by +24% in the Y direction, similar to the weight 51. As a result, since the adjustment rate is 5,200 ppm/sec, processing with 15,600 ppm is performed by processing for 3 seconds, and the characteristic after processing is +3,600 ppm.

Thereafter, the processing is repeated, and next, the weight 51 of the drive vibration arm 44 processed first is processed. The processing time is 0.9 seconds, and the characteristic after processing is −1,080 ppm. Next, the weight 54 of the drive vibration arm 47 processed for the second time is processed again, the processing time is 0.27 seconds, and the characteristic after the processing is 324 ppm, which is within ±1,000 ppm, so that the processing ends. As in this case, when the processing position is shifted by +24% of LY with the square processing mark 511g as illustrated in FIG. 12C, the processing is required to be performed four times before the adjustment ends as illustrated in the processing history illustrated in FIG. 13A.

Figure 13B:
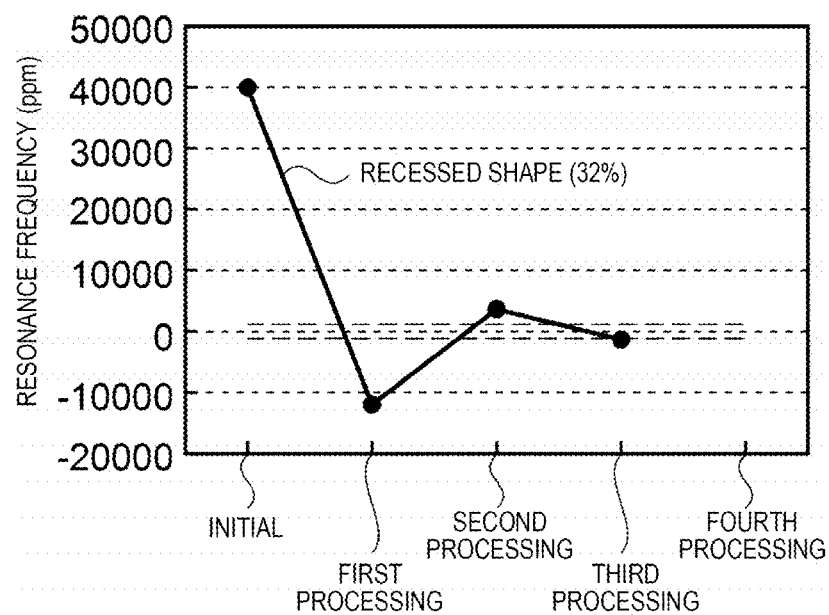
FIG. 13B is calculation data illustrating a processing history example 2 in the frequency adjustment step.

Next, assuming a case where adjustment is performed with the recessed processing mark 511e in which the width H1 of the processing mark tip end 511b is approximately 32% of the width H2 of the processing mark base end 511a as illustrated in FIG. 12B, the adjustment of the resonance frequencies of the weight 51 and the weight 54 will be described with reference to the graph of FIG. 13B. In the case of such a recessed processing mark 511e, in order to adjust 40,000 ppm, it is calculated that processing may be performed for 10 seconds as described above, and the weight to be processed first is assumed to be the weight 51.

Here, for example, when the processing position is shifted by approximately +24% of LY in the Y direction, the center of gravity position of the weight 51 is calculated so as to shift by approximately −8.0% of LY in the Y direction from the center of gravity position of the weight 51 when the reference position is processed. In the previous calculation, the adjustment rate was approximately 1.30 times when the center of gravity position of the weight 51 is shifted by approximately −8.4% of LY in the Y direction. Therefore, when the center of gravity position is shifted by approximately −8.0%, the adjustment rate is approximately 1.29 times. In other words, the actual adjustment rate is approximately 5,144 ppm/sec. Therefore, when processing is performed for 10 seconds, processing with 51,438 ppm is performed, and the characteristic after processing is approximately −11,438 ppm, with respect to 40,000 ppm before processing.

As described above, when the processing exceeds the target resonance frequency of ±1,000 ppm, the weight 51 cannot be adjusted any more, and thus the weight 54 of the drive vibration arm 47 on the opposite side across the detection vibration arm 48 is processed to adjust the resonance frequency. At this time, the setting of the adjustment rate for processing the weight 54 of the drive vibration arm 47 is 4,000 ppm/sec, and the processing time for processing with 11,438 ppm is approximately 2.86 seconds. However, since the mask opening 61a and the vibration element 1 are fixed, the processing position of the weight 54 is also shifted by +24% in the Y direction, similar to the weight 51. As a result, since the adjustment rate is approximately 5,144 ppm/sec, processing with approximately 14,708 ppm is performed by processing for approximately 2.86 seconds, and the characteristic after processing is approximately 3,270 ppm.

Next, the weight 51 of the drive vibration arm 44 processed first is processed, and the processing time is approximately 0.82 seconds, and the characteristic after processing is approximately −935 ppm, which is within ±1,000 ppm, so that the processing ends. As in this case, in the case of the recessed processing mark as illustrated in FIG. 12B in which the width H1 of the processing mark tip end 511b is 32% of the width H2 of the processing mark base end 511a, even when the processing position is shifted by +24% in the Y direction, the number of times of processing can be reduced to three as in the processing history illustrated in FIG. 13B, and the adjustment time can be shortened.

Figure 13C:
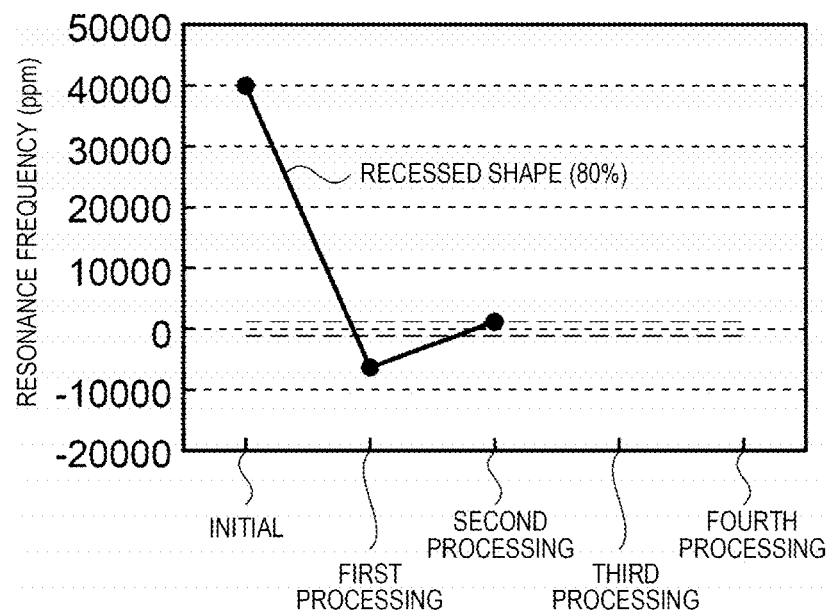
FIG. 13C is calculation data illustrating a processing history example 3 in the frequency adjustment step.

Next, considering the case where adjustment is performed with the recessed processing mark 511e as illustrated in FIG. 12B in which the width H1 of the processing mark tip end 511b is approximately 80% of the width H2 of the processing mark base end 511a, in order to adjust 40,000 ppm, it is calculated that processing may be performed for 10 seconds. Similar to the above, the weight to be processed first is assumed to be the weight 51. In addition, the processing history in such a case is illustrated in the graph of FIG. 13C. Here, for example, when the processing position is shifted by approximately +24% of LY in the Y direction, the center of gravity position of the weight 51 is calculated so as to shift by approximately −3.9% of LY in the Y direction from the center of gravity position of the weight 51 when the reference position is processed. In the previous calculation, the adjustment rate was approximately 1.30 times when the center of gravity position of the weight 51 is shifted by approximately −8.4% of LY in the Y direction. Therefore, when the center of gravity position is shifted by approximately −3.9%, the adjustment rate is approximately 1.14 times. In other words, the actual adjustment rate is approximately 4,563 ppm/sec. Therefore, when processing is performed for 10 seconds, processing with 45,625 ppm is performed, and the characteristic after processing is approximately −5,625 ppm, with respect to 40,000 ppm before processing.

As described above, when the processing exceeds the target resonance frequency of ±1,000 ppm, the weight 51 cannot be adjusted any more, and thus the weight 54 of the drive vibration arm 47 on the opposite side across the detection vibration arm 48 is processed to adjust the resonance frequency. At this time, the setting of the adjustment rate for processing the weight 54 of the drive vibration arm 47 is 4,000 ppm/sec, and the processing time for processing with 5,625 ppm is approximately 1.41 seconds. However, since the mask opening 61a and the vibration element 1 are fixed, the processing position of the weight 54 is also shifted by +24% in the Y direction, similar to the weight 51. As a result, since the adjustment rate is approximately 4,563 ppm/sec, processing with approximately 6,416 ppm is performed by processing for approximately 1.41 seconds, and the characteristic after processing is approximately 791 ppm, which is within ±1,000 ppm, so that the processing ends. As described above, in the case of the recessed processing mark 511e as illustrated in FIG. 12B in which the width H1 of the processing mark tip end 511b is 80% of the width H2 of the processing mark base end 511a, even when the processing position is shifted by +24% in the Y direction, the number of times of processing can be reduced to two as in the processing history illustrated in FIG. 13C, and the adjustment time can be shortened.

When the same calculation as above is performed, and the processing mark 511e is shifted by +24% of LY in the Y direction, in the case of the recessed processing mark 511e as illustrated in FIG. 12B in which the width of the processing mark tip end 511b is 32% or more and 96% or less of the width of the processing mark base end 511a, the number of processing can be suppressed to three times or less. In addition, it is preferable that in the case of the recessed processing mark 511e as illustrated in FIG. 12B in which the width H1 of the processing mark tip end 511b of the processing mark 511e is 80% or more and 88% or less of the width H2 of the processing mark base end 511a, the number of processing can be suppressed to two times or less.

Figure 14:
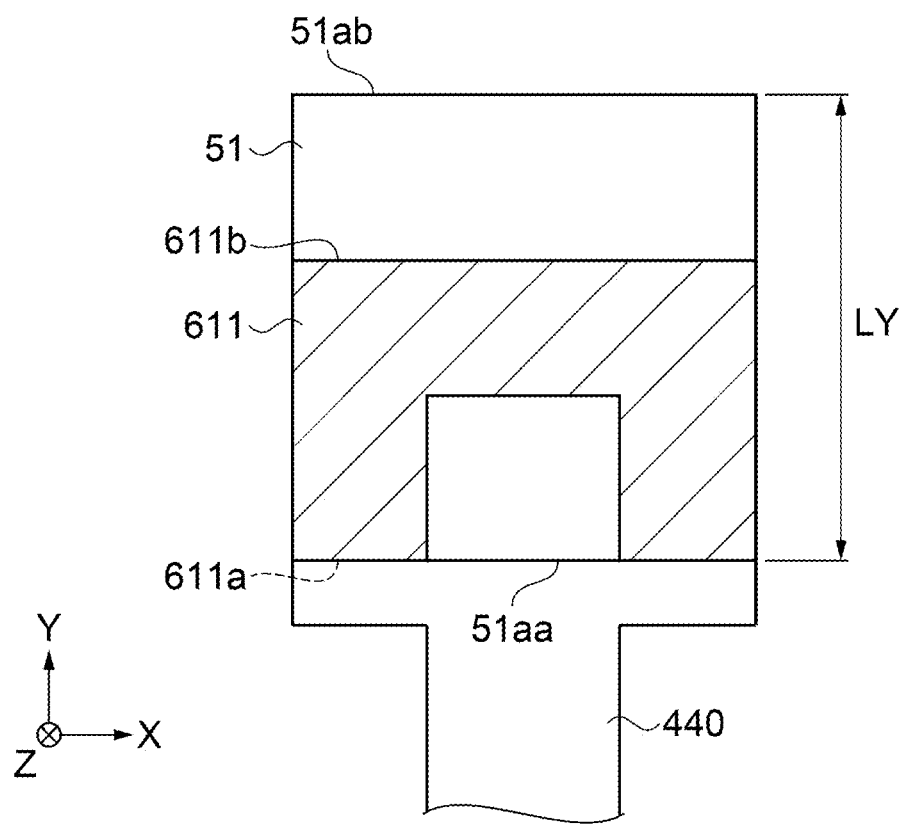
FIG. 14 is a plan view illustrating Modification Example 1 of a shape of a processing mark of a weight portion.

In addition, as illustrated in FIG. 14, a case where the frequency adjustment is performed with a mask opening that forms an inverted recessed processing mark 611 obtained by inverting the recessed shape described above by 180 degrees, in which the width of the processing mark base end 611a is smaller than the width of the processing mark tip end 611b, and the processing mark base end 611a and the weight base end 51aa of the weight 51 overlap each other in plan view, is considered. In the case of this example, the processing mark base end 611a corresponds to the first processing end, and the processing mark tip end 611b corresponds to the second processing end. FIG. 14 is a plan view illustrating Modification Example 1 of a shape of the processing mark of the weight portion.

At this time, similarly to the above-described recessed processing mark 511, and when the processing mark 611 is shifted by −24% of LY in the Y direction, in the case of the inverted recessed processing mark 611 in which the width of the processing mark base end 611a along the X axis is 32% or more and 96% or less of the width of the processing mark tip end 611b along the X axis, the number of processing can be suppressed to three times or less. In addition, it is preferable that in the case of the inverted recessed processing mark 611 in which the width of the processing mark base end 611a is 80% or more and 88% or less of the width of the processing mark tip end 611b, the number of processing can be suppressed to two times or less. Therefore, also in the case of processing with the inverted recessed processing mark 611 as illustrated in FIG. 14, the adjustment time can be shortened compared with the case of processing with the square processing mark 511 (refer to FIG. 11A).

As described above, the frequency adjustment is performed using the mask 61 of the mask opening 61a that can be processed on the processing marks 511, 511e, and 611 as in the present embodiment, so that the change in the frequency adjustment rate due to the shift of the processing position can be reduced, the frequency adjustment time can be shortened, and the vibration element 1 illustrated in FIG. 1 can be formed.

In addition, since the frequency adjustment time can be shortened by performing the frequency adjustment by the manufacturing method according to the present embodiment, the production amount of the vibration element 1 per unit time can be increased. Furthermore, since the number of times of processing for adjustment is reduced, it is possible to reduce the number of the vibration elements 1 that is repeatedly processed so far and is determined to be defective due to the adjustable amount being exceeded. These lead to a decrease in manufacturing cost, and the vibration element 1 can be provided at a lower cost.

In the above-described embodiment, as an example, a depth d1 of the processing mark 511 of the drive vibration arm 44 is formed deeper than a depth d3 of the processing mark 531 of the drive vibration arm 46 (refer to FIG. 4). In addition, although not illustrated, as an example, a depth d2 of the processing mark 521 of the drive vibration arm 45 is formed deeper than a depth d4 of the processing mark 541 of the drive vibration arm 47. The magnitude relationship between the depths d1 and d3 and the magnitude relationship between the depths d2 and d4 may be reversed, respectively. In addition, as a result, the depths of the processing marks 511, 521, 531 and 541 may be the same as each other. Furthermore, the processing marks 511, 521, 531, and 541 may be provided as necessary, and may not be formed at all.

[4] Sealing Step (Step S4)

Next, the lid 112 is bonded to the base 111 by the bonding member 113, and the recessed portion of the base 111 is sealed. As a result, the vibration element 1 is accommodated in the package 11. The sealing step is a step of sealing the inside of the package 11 in a predetermined environment, for example, a vacuum state after the lid 112 is bonded.

Among these, the lid 112 is bonded to the base 111 by providing a bonding member 113 such as a seal ring on the base 111, and the bonding member 113 is seam welded to the base 111 using, for example, a resistance welding machine, after placing the lid 112 on the bonding member 113.

Next, gas generated inside the package 11 during seam welding is discharged from the through-hole 115 in a vacuum chamber (not illustrated), and the through-hole 115 is sealed with the sealing material 116 (refer to FIG. 1).

In addition, a case where a lid 112 having a partially recessed shape (not illustrated) is used will be described. The lid 112 is bonded to the base 111 by providing the bonding member 113 such as a seal ring on the base 111, and the bonding member 113 is seam welded to the base 111 using, for example, a resistance welding machine, after placing the lid 112 on the bonding member 113. After bonding, the inside of the package 11 may be in a predetermined environment, for example, a vacuum state, and sealing may be performed by irradiating the lid recessed portion with laser.

As described above, the physical quantity sensor 10 using the vibration element 1 manufactured by the method of manufacturing the vibration element according to the present embodiment can be formed. According to such a physical quantity sensor 10, since the vibration element 1 with reduced manufacturing cost is provided, the physical quantity sensor 10 can be provided at a low cost.

Modification Example of Processing Mark

Figure 15A:
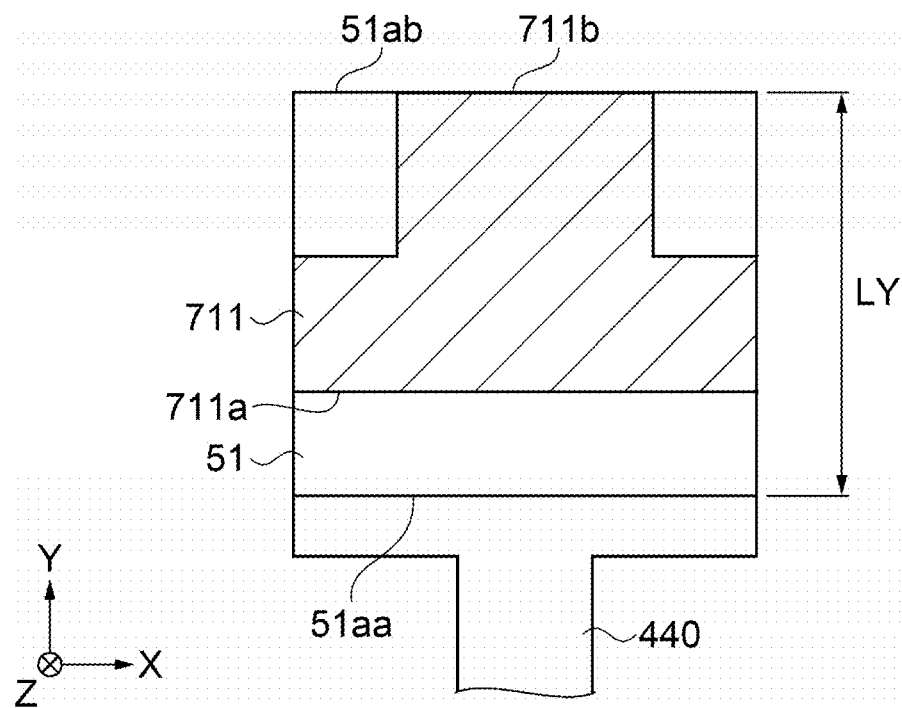
FIG. 15A is a plan view illustrating Modification Example 2 of a shape of a processing mark of the weight portion.
Figure 15B:
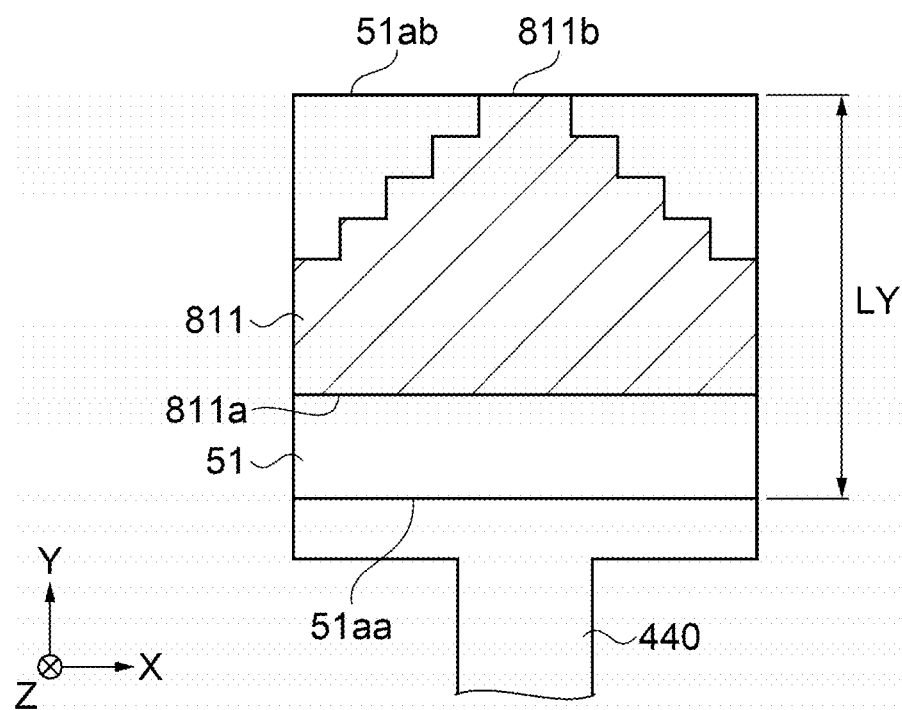
FIG. 15B is a plan view illustrating Modification Example 3 of a shape of a processing mark of the weight portion.
Figure 15C:
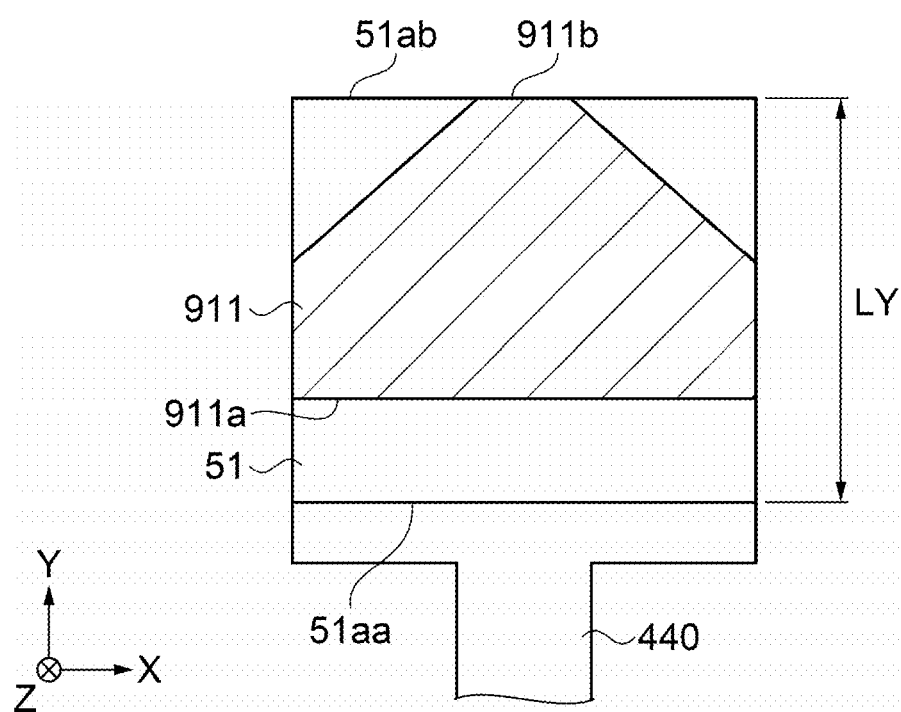
FIG. 15C is a plan view illustrating Modification Example 4 of a shape of a processing mark of the weight portion.

In the frequency adjustment step, the shape of the processing mark is not limited to the above embodiment, and the same effect can be obtained in other aspects. As other shapes of the processing marks, for example, shapes as illustrated in FIGS. 15A, 15B, and 15C can be illustrated. FIG. 15A is a plan view illustrating Modification Example 2 of a shape of a processing mark of the weight portion. FIG. 15B is a plan view illustrating Modification Example 3 of a shape of a processing mark of the weight portion. FIG. 15C is a plan view illustrating Modification Example 4 of a shape of a processing mark of the weight portion.

Hereinafter, Modification Examples 2 to 4 of the processing mark will be described, the description will be focused on the differences from the first embodiment described above, and description of similar matters will not be repeated. In FIGS. 15A, 15B, and 15C the same reference numerals are given to the same configurations as those in the above-described embodiment. In addition, hereinafter, the arm portion 440 constituting one drive vibration arm will be representatively described, and the same applies to other drive vibration arms and detection vibration arms. In addition, Modification Examples 2 to 4 below are the same as those in the first embodiment except that the shape of the mask used in the frequency adjustment step and the processing mark formed on the weight by the mask are different.

As illustrated in FIG. 15A, Modification Example 2 illustrates a processing mark 711 in which the width of the processing mark tip end 711b is smaller than the width of the processing mark base end 711a, the processing mark tip end 711b overlaps the weight tip end 51ab in plan view, and the frequency adjustment is performed using the mask 61 (refer to FIG. 8A) provided with the mask opening 61a (refer to FIG. 8A) capable of forming a so-called projected processing mark.

In this case, for example, in a case in which processing is performed using the mask 61 (refer to FIG. 8A) that can form a square processing mark in which the width in the Y direction is approximately 26% of LY as illustrated in FIG. 11A, when the center of the processing mark 511 exactly overlaps the center of the weight 51, and a center of gravity position G1a of the weight 51 is calculated, the exact center of the weight 51 is G1a. When the center of the processing mark 511 is shifted from the center of the weight 51 by 13% of LY in the Y direction, and a center of gravity position G1b of the weight 51 is calculated, the G1b is shifted from the G1a toward the base side by approximately 5% of LY. However, as in Modification Example 2 illustrated in FIG. 15A, for example, in a case in which the processing using the mask that can form a projected processing mark 711 in which the total width of the processing mark tip end 711b is 72% of the processing mark base end 711a, when the same calculation is performed, the difference between the center of gravity position G2a when the processing position is not shifted and the center of gravity position G2b when the processing position is shifted by 13% of LY in the Y direction can be 1% or less of LY.

Therefore, by adjusting the frequency using the mask of the mask opening 61a (refer to FIG. 8A) that can be processed with the processing mark 711 as in Modification Example 2, a change in the frequency adjustment rate due to the shift of the processing position can be reduced, and the frequency adjustment time can be shortened.

As illustrated in FIG. 15B, Modification Example 3 illustrates a processing mark 811 in which the width in the direction along the X axis increases as approaches from the processing mark tip end 811b of the processing mark 811 to the processing mark base end 811a, based on the projected shape of FIG. 15A. Even when the frequency adjustment is performed using the processing mark 811 having such a shape, the same effect as described above can be obtained.

In addition, instead of a step-shaped processing mark 811 as illustrated in FIG. 15B, as illustrated in FIG. 15C, Modification Example 4 illustrates a so-called trapezoidal processing mark 911 having a diagonal line inclined with respect to the direction along the Y axis from the processing mark tip end 911b toward the processing mark base end 911a. Even when the frequency adjustment is performed using the processing mark 911 having such a shape, the same effect as described above can be obtained.

In the recessed processing mark 511 described above, the outer edge of the inner side or the outer side of the recessed shape may be configured to include a diagonal line inclined with respect to the direction along the Y axis from the processing mark tip end 511b toward the processing mark base end 511a. In addition, in the recessed processing mark 511 described above, the outer edge of the inner side or the outer side of the recessed shape may not be a straight line. Even in such a case, the same effect as described above can be obtained.

In addition, in the above-described processing marks 511, 711, 811 and 911, the processing mark base ends 511a, 711a, 811a and 911a as the second processing ends may not overlap the weight base end 51aa which is one of the pair of weight ends in plan view. As described above, the processing mark base ends 511a, 711a, 811a, and 911a do not overlap the weight base end 51aa in plan view, in other words, the processing mark base ends 511a, 711a, 811a, and 911a are in the weights 51, 71, 81, and 91. Therefore, in the frequency adjustment step, it is possible to reduce the variation in the center of gravity position of the weight and the variation in the frequency adjustment rate due to the variation in the position of the processing mark.

In addition, in the processing mark 611 according to Modification Example 1 described with reference to FIG. 14, the processing mark tip end 611b as the second processing end may not overlap the weight tip end 51ab, which is one of the pair of weight ends, in plan view. As described above, the processing mark tip end 611b as the second processing end does not overlap the weight tip end 51ab in plan view, in other words, the processing mark tip end 611b is in the weight 51. Therefore, in the frequency adjustment step, it is possible to reduce the variation in the center of gravity position of the weight due to the variation in the position of the processing mark and the variation in the frequency adjustment rate.

4. Inertial Measurement Unit

Figure 16:
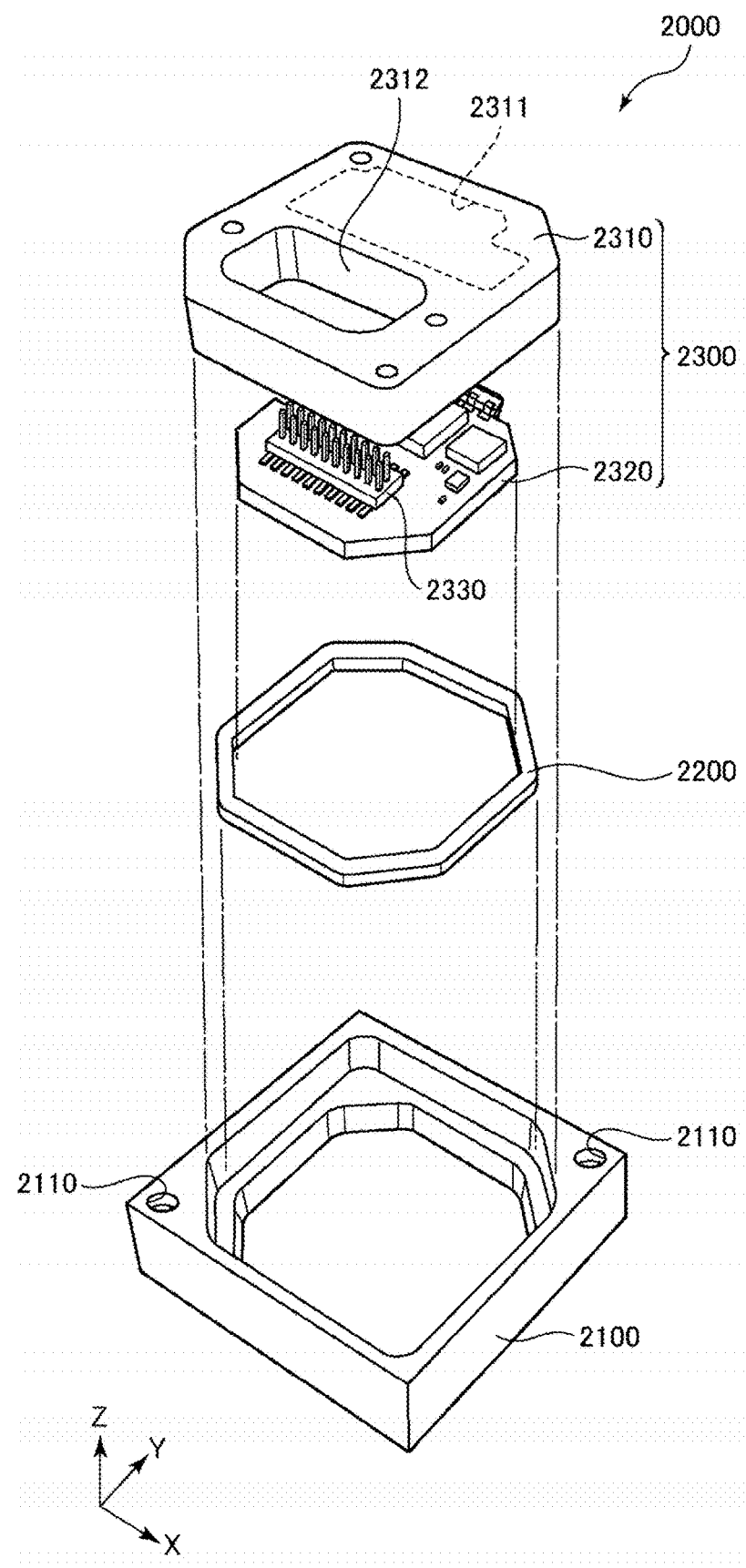
FIG. 16 is an exploded perspective view illustrating an embodiment of an inertial measurement unit according to the present disclosure.
Figure 17:
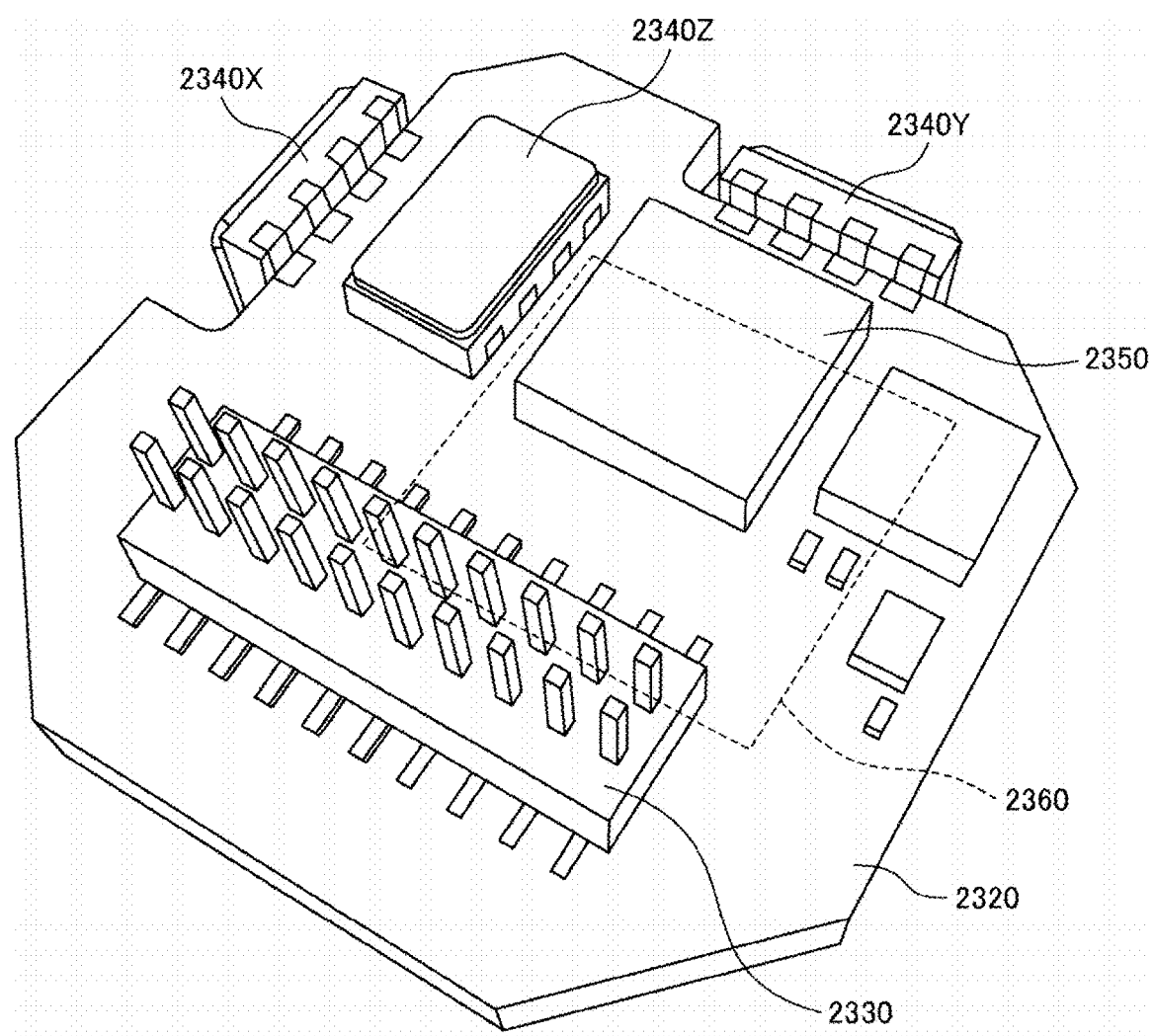
FIG. 17 is a perspective view of a substrate provided in the inertial measurement unit illustrated in FIG. 16.

FIG. 16 is an exploded perspective view illustrating an embodiment of an inertial measurement unit according to the present disclosure. FIG. 17 is a perspective view of a substrate provided in the inertial measurement unit illustrated in FIG. 16.

An inertial measurement unit 2000 (IMU) illustrated in FIG. 16 is a so-called six-axis motion sensor, is used by being mounted on a vehicle such as an automobile or a robot, that is, a measurement object, and detects a posture and behavior of the vehicle, that is, an inertial momentum.

The inertial measurement unit 2000 is provided with an outer case 2100, a bonding member 2200, and a sensor module 2300, and the sensor module 2300 is fitted into the bonding member 2200 interposed in the outer case 2100.

The outer case 2100 has a box shape, and screw holes 2110 for screwing the measurement object are provided at two corners on the opposite angle of the outer case 2100.

The sensor module 2300 is provided with an inner case 2310 and a substrate 2320, and is housed inside the outer case 2100 described above in a state where the inner case 2310 supports the substrate 2320. Here, the inner case 2310 is bonded to the outer case 2100 with an adhesive or the like via the bonding member 2200 such as a rubber packing. In addition, the inner case 2310 includes a recessed portion 2311 that functions as a storage space for components mounted on the substrate 2320, and an opening portion 2312 for exposing the connector 2330 provided at the substrate 2320 to the outside. The substrate 2320 is, for example, a multilayer wiring substrate, and is bonded to the inner case 2310 with an adhesive or the like.

As illustrated in FIG. 17, a connector 2330, angular velocity sensors 2340X, 2340Y, and 2340Z, an acceleration sensor 2350, and a control IC 2360 are mounted on the substrate 2320.

The connector 2330 is electrically coupled to an external device (not illustrated), and is used to transmit and receive electrical signals such as power and measurement data between the external device and the inertial measurement unit 2000.

The angular velocity sensor 2340X detects an angular velocity around the X axis, the angular velocity sensor 2340Y detects an angular velocity around the Y axis, and the angular velocity sensor 2340Z detects an angular velocity around the Z axis. Here, each of the angular velocity sensors 2340X, 2340Y, and 2340Z is the physical quantity sensor 10 described above. In addition, the acceleration sensor 2350 is an acceleration sensor formed using, for example, a MEMS technology, and detects acceleration in each of the X axis, Y axis, and Z axis directions.

The control IC 2360 is a micro controller unit (MCU), incorporates a storage unit including a nonvolatile memory, an A/D converter, and the like, and controls each unit of the inertial measurement unit 2000. Here, the storage unit stores a program that defines the order and contents for detecting the acceleration and the angular velocity, a program that digitizes detection data and incorporates the detection data into packet data, accompanying data, and the like.

As described above, the inertial measurement unit 2000 is provided with the physical quantity sensor 10 including the vibration element 1 such as the angular velocity sensors 2340X, 2340Y, and 2340Z, and the control IC 2360 that is a circuit electrically coupled to the physical quantity sensor 10. According to such an inertial measurement unit 2000, the inertial measurement unit 2000 can be provided at low cost by using the physical quantity sensor 10 provided at low cost.

5. Electronic Device

Figure 18:
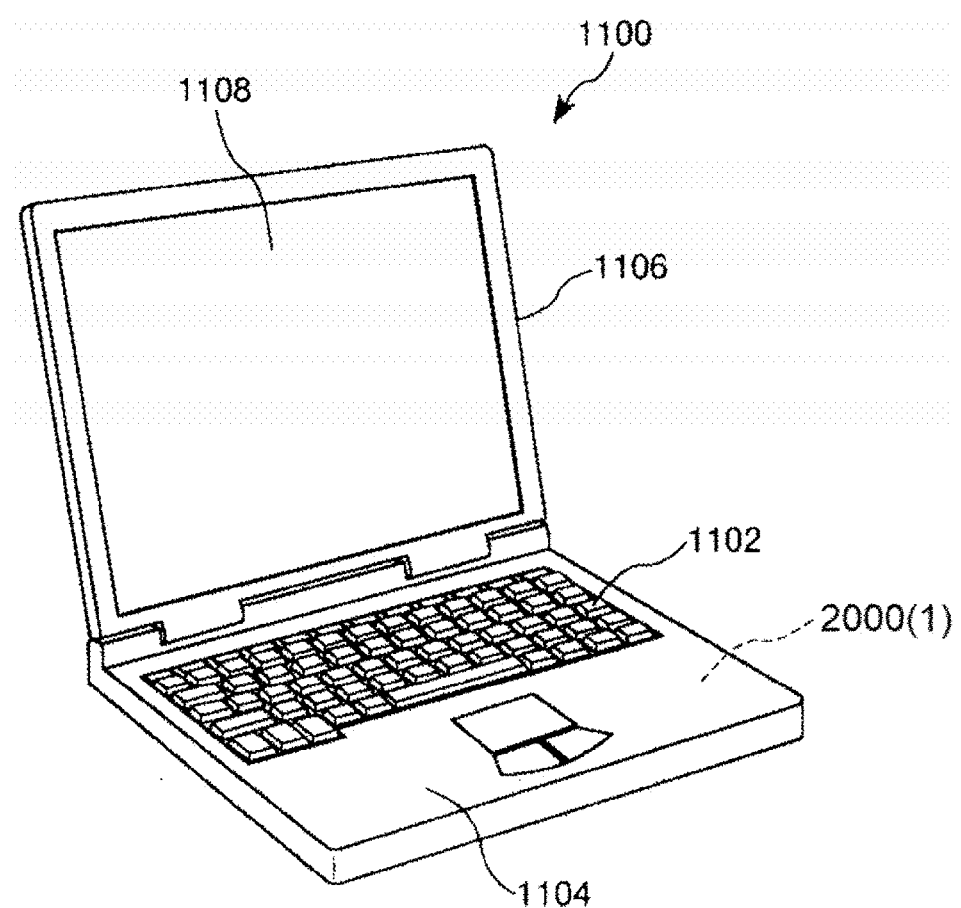
FIG. 18 is a perspective view illustrating an embodiment (mobile (or notebook) personal computer) of an electronic device according to the present disclosure.

FIG. 18 is a perspective view illustrating an embodiment (mobile (or notebook) personal computer) of an electronic device according to the present disclosure.

In this drawing, a personal computer 1100 is configured to include a main body portion 1104 provided with a keyboard 1102 and a display unit 1106 provided with a display portion 1108. The display unit 1106 is supported so as to be rotatable with respect to the main body portion 1104 via a hinge structure portion. Such a personal computer 1100 incorporates the inertial measurement unit 2000 including the vibration element 1 described above.

Figure 19:
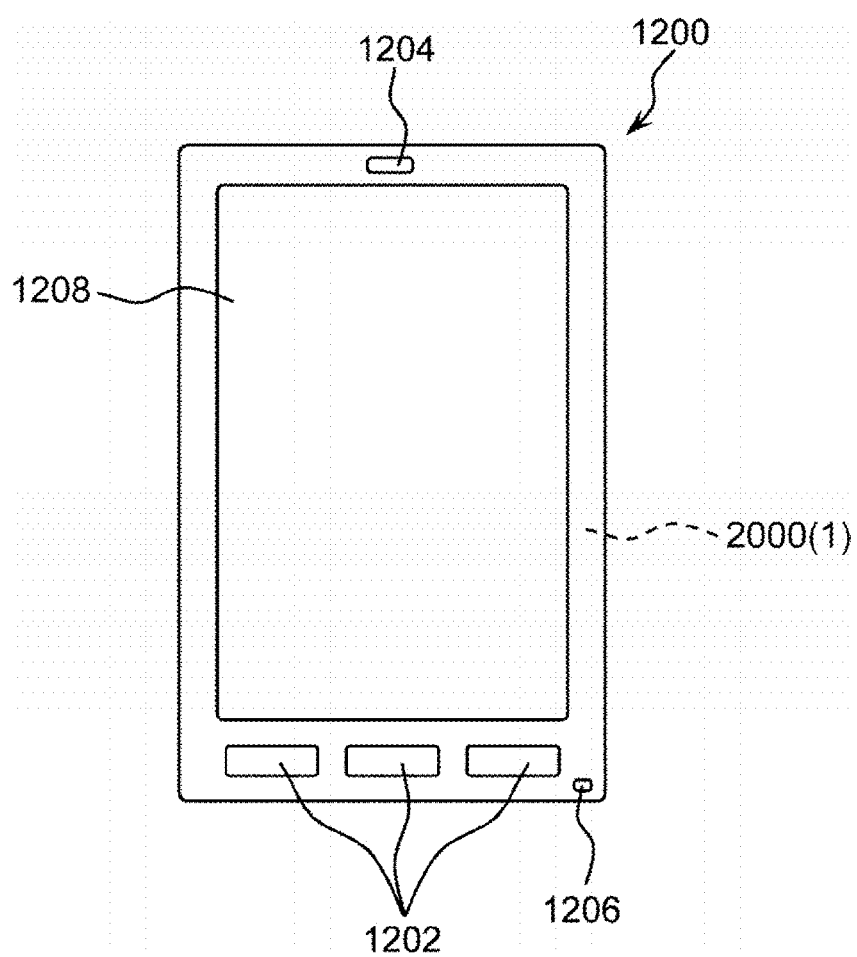
FIG. 19 is a plan view illustrating an embodiment (mobile phone) of the electronic device according to the present disclosure.

FIG. 19 is a plan view illustrating an embodiment (mobile phone) of the electronic device according to the present disclosure.

In this figure, a mobile phone 1200 is provided with an antenna (not illustrated), a plurality of operation buttons 1202, an earpiece 1204, and a mouthpiece 1206, and a display portion 1208 is disposed between the operation buttons 1202 and the earpiece 1204. Such a mobile phone 1200 incorporates an inertial measurement unit 2000 including the vibration element 1 described above.

Figure 20:
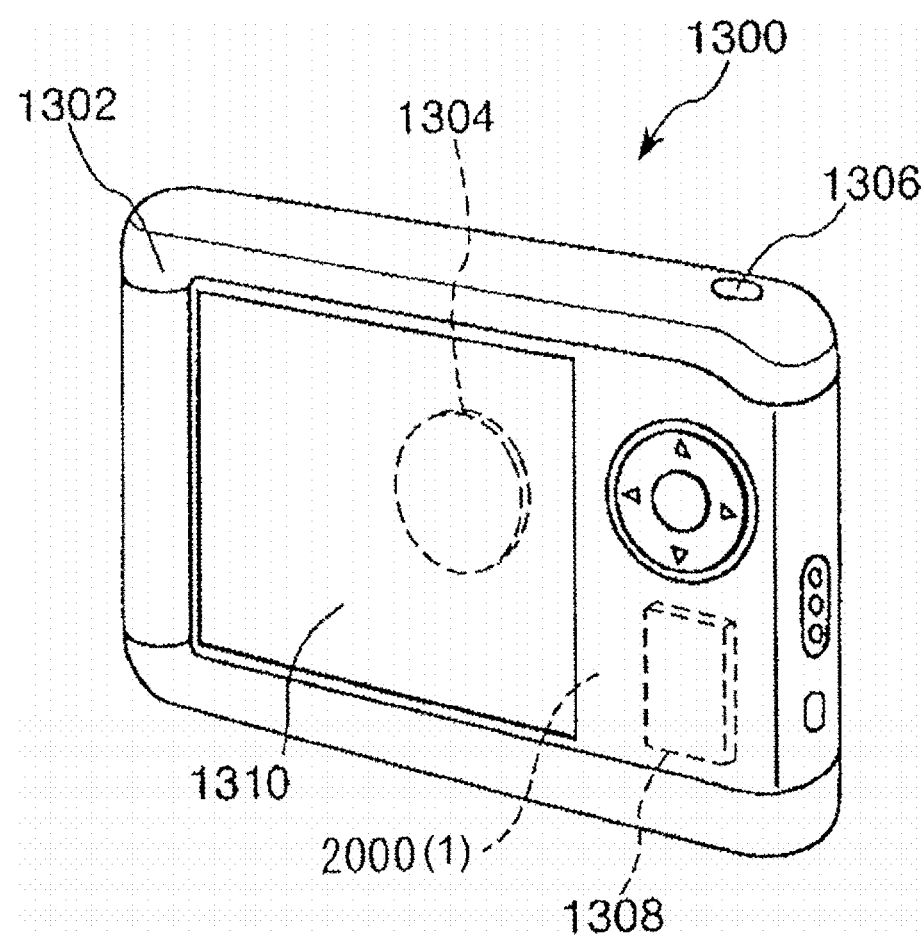
FIG. 20 is a perspective view illustrating an embodiment (digital still camera) of the electronic device according to the present disclosure.

FIG. 20 is a perspective view illustrating an embodiment (digital still camera) of the electronic device according to the present disclosure.

In FIG. 20, a display portion 1310 is provided at a rear surface of a case 1302 in a digital still camera 1300, and is configured to perform display based on an imaging signal from the CCD. The display portion 1310 functions as a viewfinder that displays a subject as an electronic image. In addition, a light receiving unit 1304 including an imaging optical system such as an optical lens, a CCD, and the like is provided on the front side of the case 1302, that is, the rear side in the drawing. When the photographer confirms the subject image displayed on the display portion 1310 and presses a shutter button 1306, the CCD image pickup signal at that time is transferred and stored in a memory 1308. Such a digital still camera 1300 incorporates an inertial measurement unit 2000 including the vibration element 1 described above, and the measurement result of the inertial measurement unit 2000 is used for, for example, camera shake correction.

The electronic device as described above is provided with the vibration element 1. According to such an electronic device, the electronic device can be provided at low cost by using the vibration element 1 provided at low cost.

The electronic device according to the present disclosure can be applied to, for example, a smartphone, a tablet terminal, a timepiece (including a smart watch), an ink jet discharge device (for example, an ink jet printer), wearable terminals such as a head mounted display (HMD), laptop personal computer, TV, video camera, video tape recorder, car navigation device, pager, electronic organizer (including communication functions), electronic dictionary, calculator, electronic game machine, word processor, workstation, videophone, TV monitor for security, electronic binoculars, POS terminal, medical equipment (such as electronic thermometer, blood pressure monitor, blood glucose meter, electrocardiogram measuring device, ultrasonic diagnostic device, electronic endoscope), fish finder, various measuring instruments, instruments (such as instruments of automobile, aircraft, and ship), base station for portable terminals, flight simulator, and the like, in addition to the personal computer of FIG. 18, the mobile phone of FIG. 19, the digital still camera of FIG. 20.

6. Vehicle

Figure 21:
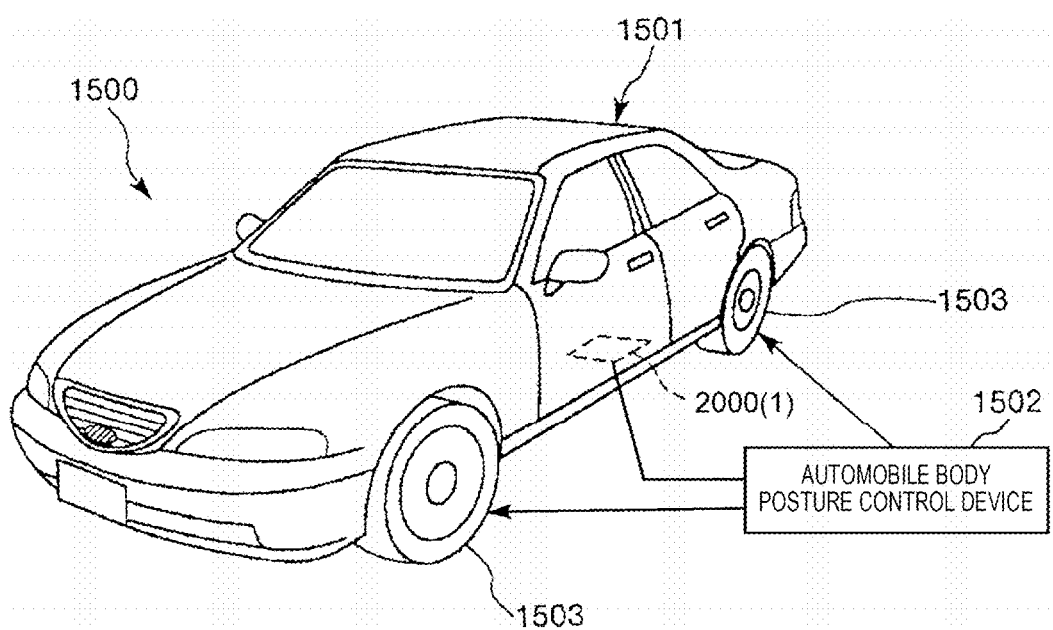
FIG. 21 is a perspective view illustrating an embodiment (automobile) of a vehicle according to the present disclosure.

FIG. 21 is a perspective view illustrating an embodiment (automobile) of a vehicle according to the present disclosure.

An automobile 1500 illustrated in FIG. 21 incorporates an inertial measurement unit 2000 including the vibration element 1 described above. For example, the inertial measurement unit 2000 can detect a posture of an automobile body 1501. The detection signal of the inertial measurement unit 2000 is supplied to an automobile body posture control device 1502. The automobile body posture control device 1502 can detect the posture of the automobile body 1501 based on the signal, and can control the hardness of a suspension and brakes of individual wheels 1503 according to the detection result.

In addition, such a posture control can be used with a radio controlled helicopter such as a biped robot or drone. As described above, the inertial measurement unit 2000 is incorporated in realizing the posture control of various vehicles.

As described above, the automobile 1500 that is a vehicle is provided with the vibration element 1. According to such an automobile 1500, the characteristics of the automobile 1500 can be provided at low cost by using the vibration element 1 provided at low cost.

Hereinbefore, the method of adjusting the frequency of the vibration element, the method of manufacturing the vibration element, the vibration element, the physical quantity sensor, the inertial measurement unit, the electronic device, and the vehicle according to the present disclosure are described based on the illustrated embodiments, and the disclosure is not limited thereto. The configuration of each part can be replaced with any configuration having the same function. In addition, any other component may be added to the present disclosure.

In the above-described embodiment, the vibration element has a wide weight portion, and the vibration element may not have such a wide weight portion. That is, the width on the tip end side of the drive vibration arm may be the same as the width at the area on the base end side, that is, the arm portion. In this case, a range of 30% from the tip end of the drive vibration arm, that is, 30% of the total length of the drive vibration arm is regarded as the weight portion. In addition, the vibration element has two sets of a pair of drive vibration arms parallel to each other and extend to the same side with respect to the base in plan view, and the pair of drive vibration arms may be one set.

In addition, in the above-described embodiment, the vibration element has a so-called double T shape, and is not limited thereto. For example, various types such as an H type, a bipod tuning fork, a tripod tuning fork, an orthogonal type, and a prismatic type may be used.

In addition, in the above-described embodiment, the vibration element used in a so-called gyroscope and the method of manufacturing the vibration element are described, and the disclosure is not limited thereto. Any element that requires a frequency adjustment step, such as a timing device and an acceleration sensor element may be used.

In addition, as the constituent material of the above-described vibrating body, for example, a piezoelectric material other than quartz, such as a piezoelectric single crystal such as lithium tantalate or lithium niobate, or piezoelectric ceramics may be used.

In addition, in the present embodiment, the ion beam is used as the method of processing the frequency adjustment weight, and for example, a pulsed laser such as YAG, $YVO_4$, and excimer laser, a continuous wave laser such as a carbon dioxide gas laser, and an ion beam such as focused ion beam (FIB) may be used.

Hereinafter, the contents derived from the embodiments described above will be described as each aspect.

[Aspect 1] A vibration element according to the present aspect includes a base, a vibration arm extending from the base, and a weight provided at the vibration arm, and including a pair of weight ends aligned in an extending direction of the vibration arm, in which a processing mark in which the weight is thinned or removed in a thickness direction of the vibration arm at a portion of the weight, is formed at the weight, the processing mark includes a first processing end and a second processing end aligned in the extending direction of the vibration arm, at least the first processing end overlaps one weight end of the pair of weight ends of the weight in plan view in the extending direction of the vibration arm, and a width of the first processing end in a width direction of the vibration arm, which is a direction orthogonal to the extending direction of the vibration arm and the thickness direction of the vibration arm, is smaller than a width of the second processing end in the width direction of the vibration arm.

According to the vibration element of the present aspect, in the frequency adjustment step of thinning or removing at least a portion of the weight, when the processing mark varies in the extending direction of the vibration arm, it is possible to reduce the variation in the center of gravity position of the weight due to the variation in the position of the processing mark. In addition, as a result, variations in the frequency adjustment rate can be reduced and the adjustment accuracy can be improved, so that the adjustment time can be shortened.

[Aspect 2] In the above vibration element, the pair of weight ends may include a first weight end and a second weight end located at a position closer than the first weight end with the base as a reference, and the first processing end may overlap the first weight end in plan view.

According to the present aspect, in the frequency adjustment step, in particularly, when the processing mark varies in a direction far from the base in the extending direction of the vibration arm, the variation in the center of gravity position of the weight due to the variation in the position of the processing mark and the variation in the frequency adjustment rate can be reduced, and the adjustment time can be shortened.

[Aspect 3] In the above vibration element, the pair of weight ends may include a first weight end and a second weight end located at a position closer than the first weight end with the base as a reference, and the first processing end may overlap the second weight end in plan view.

According to the present aspect, in the frequency adjustment step, in particular, when the processing mark varies in a direction closer to the base in the extending direction of the vibration arm, the variation in the center of gravity position of the weight due to the variation in the position of the processing mark and the variation in the frequency adjustment rate can be reduced.

[Aspect 4] In the above vibration element, the second processing end may not overlap either of the pair of weight ends in plan view.

According to the present aspect, the second processing end does not overlap either of the pair of weight ends in plan view, in other words, the second processing end is in the weight. Therefore, in the frequency adjustment step, the variation in the center of gravity position of the weight due to the variation in the position of the processing mark and the variation in the frequency adjustment rate can be reduced.

[Aspect 5] In the above vibration element, the processing mark may have a rectangular shape.

According to the present aspect, in the frequency adjustment step, the processing mark has the rectangular shape to facilitate calculation of the center of gravity position of the weight, and it is easy to determine a shape that minimizes the positional shift of the center of gravity position of the weight due to the positional shift of the processing mark.

[Aspect 6] In the above vibration element, a width H1 of the first processing end may have a relationship of 32% or more and 96% or less of a width H2 of the second processing end.

According to the present aspect, in a case in which a predetermined adjustment rate is set with one initial frequency characteristic in the frequency adjustment step, if the width H1 and the width H2 are the same as each other in the related art, the number of additional adjustments is required four times due to the variation in the adjustment rate when the processing position is shifted at the maximum. However, when the frequency adjustment is performed with the processing mark having the relationship between the width H1 and the width H2 as described above, the number of additional adjustments can be reduced to three times even when the processing position is shifted at the maximum.

[Aspect 7] In the above vibration element, a width H1 of the first processing end may have a relationship of 80% or more and 88% or less of a width H2 of the second processing end.

According to the present aspect, in a case in which a predetermined adjustment rate is set with one initial frequency characteristic in the frequency adjustment step, if the width H1 and the width H2 are the same as each other in the related art, the number of additional adjustments is required four times due to the variation in the adjustment rate when the processing position is shifted at the maximum. However, when the frequency adjustment is performed with the processing mark having the relationship between the width H1 and the width H2 as described above, the number of additional adjustments can be reduced to two times even when the processing position is shifted at the maximum.

[Aspect 8] A method of manufacturing a vibration element according to the present aspect, including a base, a vibration arm extending from the base, and a weight provided at the vibration arm, and including a pair of weight ends aligned in an extending direction of the vibration arm includes: forming a processing mark in which the weight is thinned or removed in a thickness direction of the vibration arm at a portion of the weight, at the weight. The formed processing mark includes a first processing end and a second processing end aligned in the extending direction of the vibration arm, at least the first processing end overlaps one weight end of the pair of weight ends of the weight in plan view in the extending direction of the vibration arm, and a width of the first processing end in a width direction of the vibration arm, which is a direction orthogonal to the extending direction of the vibration arm and the thickness direction of the vibration arm, is smaller than a width of the second processing end in the width direction of the vibration arm.

According to the method of manufacturing a vibration element according to the present aspect, in the frequency adjustment step of thinning or removing at least a portion of the weight, when the processing mark varies in the extending direction of the vibration arm, it is possible to reduce the variation in the center of gravity position of the weight due to the variation in the position of the processing mark. In addition, as a result, variations in the frequency adjustment rate can be reduced and the adjustment accuracy can be improved, so that the adjustment time can be shortened.

[Aspect 9] A physical quantity sensor according to the present aspect includes the vibration element according to any one of the above aspects 1 to 7, and a package that houses the vibration element.

According to the physical quantity sensor according to the present aspect, since the cost of the vibration element can be reduced, the physical quantity sensor can be provided at a low cost.

[Aspect 10] An inertial measurement apparatus according to the present aspect includes the above physical quantity sensor, and a circuit electrically coupled to the physical quantity sensor.

According to the inertial measurement unit according to the present aspect, since the cost of the vibration element can be reduced, the inertial measurement unit can be provided at a low cost.

[Aspect 11] An electronic device according to the present aspect includes the vibration element according to any one of the above aspects 1 to 7, and a circuit that outputs a drive signal to the vibration element.

According to the electronic device according to the present aspect, since the cost of the vibration element can be reduced, the electronic device can be provided at a low cost.

[Aspect 12] A vehicle according to the present aspect includes a physical quantity sensor having the vibration element according to any one of the above aspects 1 to 7, and a circuit that outputs a drive signal to the physical quantity sensor.

According to the vehicle according to the present aspect, since the cost of the vibration element can be reduced, the vehicle can be provided at a low cost.

What is claimed is:

1. A vibration element comprising:
a base;
a vibration arm extending from the base; and
a weight provided at the vibration arm, and including a pair of weight ends aligned in an extending direction of the vibration arm, wherein
a processing mark in which the weight is thinned or removed in a thickness direction of the vibration arm at a portion of the weight, is formed at the weight,
the processing mark includes a first processing end and a second processing end aligned in the extending direction of the vibration arm, an electrode coupled to the vibration arm terminates before the second processing end,
at least the first processing end overlaps one weight end of the pair of weight ends of the weight in plan view in the extending direction of the vibration arm, and
a width of the first processing end in a width direction of the vibration arm, which is a direction orthogonal to both the extending direction of the vibration arm and the thickness direction of the vibration arm, is smaller than a width of the second processing end in the width direction of the vibration arm.

2. The vibration element according to claim 1, wherein the pair of weight ends includes a first weight end and a second weight end, the base is closer to the second weight end than to the first weight end, and the first processing end overlaps the first weight end in plan view.

3. The vibration element according to claim 1, wherein the pair of weight ends includes a first weight end and a second weight end, the base is closer to the second weight end than to the first weight end, and the first processing end overlaps the second weight end in plan view.

4. The vibration element according to claim 1, wherein the second processing end does not overlap either of the pair of weight ends in plan view.

5. The vibration element according to claim 1, wherein the processing mark has a rectangular shape.

6. The vibration element according to claim 1, wherein a width H1 of the first processing end has a relationship of 32% or more and 96% or less of a width H2 of the second processing end.

7. The vibration element according to claim 1, wherein a width H1 of the first processing end has a relationship of 80% or more and 88% or less of a width H2 of the second processing end.

8. A physical quantity sensor comprising:
the vibration element according to claim 1; and
a package that houses the vibration element.

9. An inertial measurement unit comprising:
the physical quantity sensor according to claim 8; and
a circuit electrically coupled to the physical quantity sensor.

10. An electronic device comprising:
the vibration element according to claim 1; and
a circuit that outputs a drive signal to the vibration element.

11. A vehicle comprising:
a physical quantity sensor including the vibration element according to claim 1; and
a circuit that outputs a drive signal to the physical quantity sensor.

12. A method of manufacturing a vibration element which includes a base, a vibration arm extending from the base, and a weight provided at the vibration arm, and including a pair of weight ends aligned in an extending direction of the vibration arm, the method comprising:

forming a processing mark at a portion of the weight in which the weight is thinned or removed in a thickness direction of the vibration arm, wherein the formed processing mark includes a first processing end and a second processing end aligned in the extending direction of the vibration arm, an electrode coupled to the vibration arm terminates before the second processing end of the processing mark, at least the first processing end overlaps one weight end of the pair of weight ends of the weight in plan view in the extending direction of the vibration arm, and a width of the first processing end in a width direction of the vibration arm, which is a direction orthogonal to both the extending direction of the vibration arm and the thickness direction of the vibration arm, is smaller than a width of the second processing end in the width direction of the vibration arm.

13. The method of manufacturing a vibration element according to claim 12, wherein the pair of weight ends includes a first weight end and a second weight end, the base is closer to the second weight end than to the first weight end, and the first processing end overlaps the first weight end in plan view.

14. The method of manufacturing a vibration element according to claim 12, wherein the pair of weight ends includes a first weight end and a second weight end, the base is closer to the second weight end than to the first weight end, and the first processing end overlaps the second weight end in plan view.

15. The method of manufacturing a vibration element according to claim 12, wherein the second processing end does not overlap either of the pair of weight ends in plan view.

16. The method of manufacturing a vibration element according to claim 12, wherein the processing mark has a rectangular shape.

17. The method of manufacturing a vibration element according to claim 12, wherein a width H1 of the first processing end has a relationship of 32% or more and 96% or less of a width H2 of the second processing end.

18. The method of manufacturing a vibration element according to claim 12, wherein a width H1 of the first processing end has a relationship of 80% or more and 88% or less of a width H2 of the second processing end.

* * * * *